United States Patent
Lin

(10) Patent No.: US 6,711,212 B1
(45) Date of Patent: Mar. 23, 2004

(54) VIDEO TRANSCODER, VIDEO TRANSCODING METHOD, AND VIDEO COMMUNICATION SYSTEM AND METHOD USING VIDEO TRANSCODING WITH DYNAMIC SUB-WINDOW SKIPPING

(75) Inventor: Chia-Wen Lin, Taiwan (TW)

(73) Assignee: Industrial Technology Research Institute (TW)

( * ) Notice: Subject to any disclaimer, the term of this patent is extended or adjusted under 35 U.S.C. 154(b) by 483 days.

(21) Appl. No.: 09/667,538

(22) Filed: Sep. 22, 2000

(51) Int. Cl.$^7$ ................................................ H04N 7/12
(52) U.S. Cl. ................................................ 375/240.24
(58) Field of Search ....................... 375/240.01, 240.12, 375/240.16, 240.24, 240.26, 240.27, 240.29; 382/232, 235, 238; 709/232; 348/14.01, 14.07–14.13, 14.15; H04N 7/12

(56) References Cited

U.S. PATENT DOCUMENTS

| | | | |
|---|---|---|---|
| 5,537,440 A | | 7/1996 | Eyuboglu et al. |
| 5,541,852 A | * | 7/1996 | Eyuboglu et al. ........... 709/232 |
| 5,544,266 A | | 8/1996 | Koppelmans et al. |
| 5,600,646 A | | 2/1997 | Polomski |
| 5,657,015 A | | 8/1997 | Nakajima et al. |
| 5,729,293 A | | 3/1998 | Keesman |

OTHER PUBLICATIONS

ITU–T Recommendation H.261, "Video codec for audiovisual services at p×64 kbits/s", Mar. 1993, pp. 1–25.

ITU–T Recommendation H.263, "Video coding for low bit–rate communication" Feb. 1998, pp. i–154.

A. Eleftheriadis, et al, "Constrained and General Dynamic Rate Shaping of Compressed Digital Video", Department of Electrical Engineering and Center for Telecommunications Research, IEEE, Oct. 1995, pp.396–399.

G. Keesman, et al., "Transcoding of MPEG bitstreams" Signal Processing Image Comm., vol. 8, 1996, pp. 481–500.

H. Sun, et al., "Architectures for MPEG Compressed Bitstream Scaling", IEEE Trans. Circuits Syst. Video Technol., vol. 6, No. 2, Apr. 1996, pp. 191–199.

(List continued on next page.)

Primary Examiner—Young Lee
(74) Attorney, Agent, or Firm—Stevens, Davis, Miller & Mosher, LLP

(57) ABSTRACT

A multipoint video conferencing system employs a transcoder with a dynamic sub-window skipping technique to enhance the visual quality of the participants of interest. The system firstly identifies the active conferees from the multiple incoming video streams by calculating the temporal and the spatial activities of the conferee sub-windows. The sub-windows of inactive participants are dropped and the saved bits are reallocated to the active sub-windows. Numerous motion vector composition schemes can be used to compose the unavailable motion vectors in the dropped frames due to limited bit-rates or frame-rates of the user clients in video transcoding. The present invention employs a pre-filtered activity-based forward dominant vector selection (PA-FDVS) scheme which provides accurate approximation of motion vectors with low computational cost and memory requirement. Simulation results show the visual quality of the active sub-windows is significantly improved at the cost of degrading the temporal resolution of the inactive sub-windows, which degradation is relatively invisible to human perception.

24 Claims, 28 Drawing Sheets

OTHER PUBLICATIONS

P. Assuncao, et al., "A Frequency–Domain Video Transcoder for Dynamic Bit–Rate Reduction of MPEG–2 Bit Streams", IEEE Trans. Circuits Syst. Video Technol., vol. 8, No. 8, pp. 953–967.

M. Sun, et al., "Dynamic Bit Allocation in Video Conbining for Multipoint Conferencing", IEEE Trans. On Circuits and Systems, vol. 45, No. 5, May 1998, pp. 644–648.

J. Youn, et al., "Motion Estimation for High Performance Transcoding", IEEE Trans. Consumer Electronics, vol. 44, No. 3, Aug. 1998, pp. 649–658.

J. Youn, et al., "Motion Vector Refinement for High–Performance Transcoding", IEEE Trans. On Multimedia, vol. 1, No. 1, Mar. 1999, pp. 30–40.

B. Shen, et al. "Adaptive Motion–Vector Resampling for Compressed Video Downscaling", IEEE Trans. On Circuits and Syst. For Video Tech., vol. 9, No. 6, Sep. 1999, pp. 929–936.

ITU–T/SG15, "Vide codec test m del, TMN8", P rtland, Jun. 1997, pp. i–13.

* cited by examiner

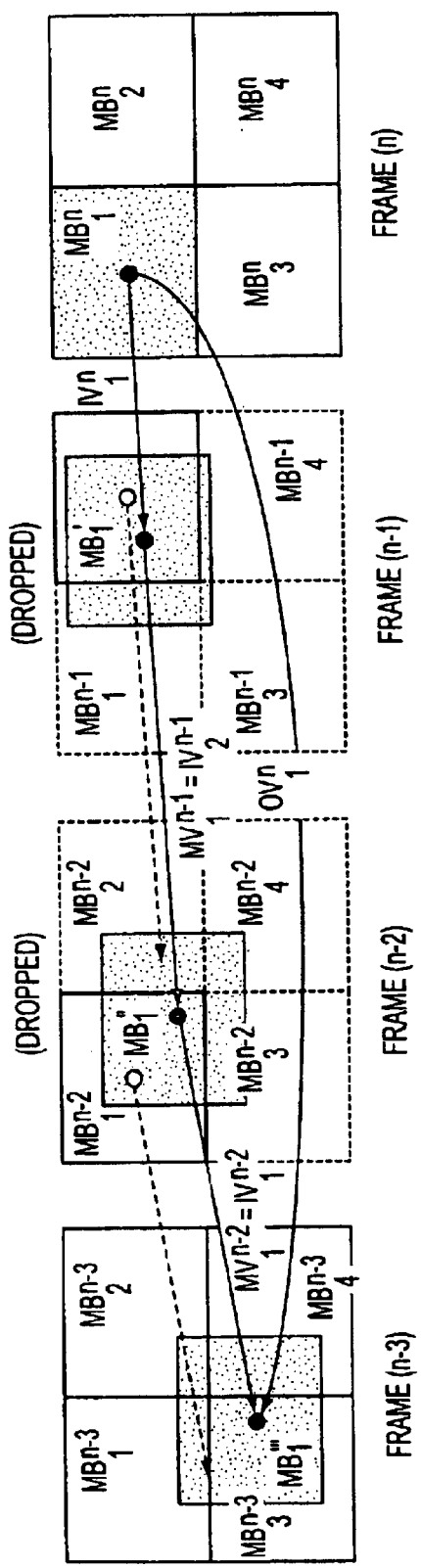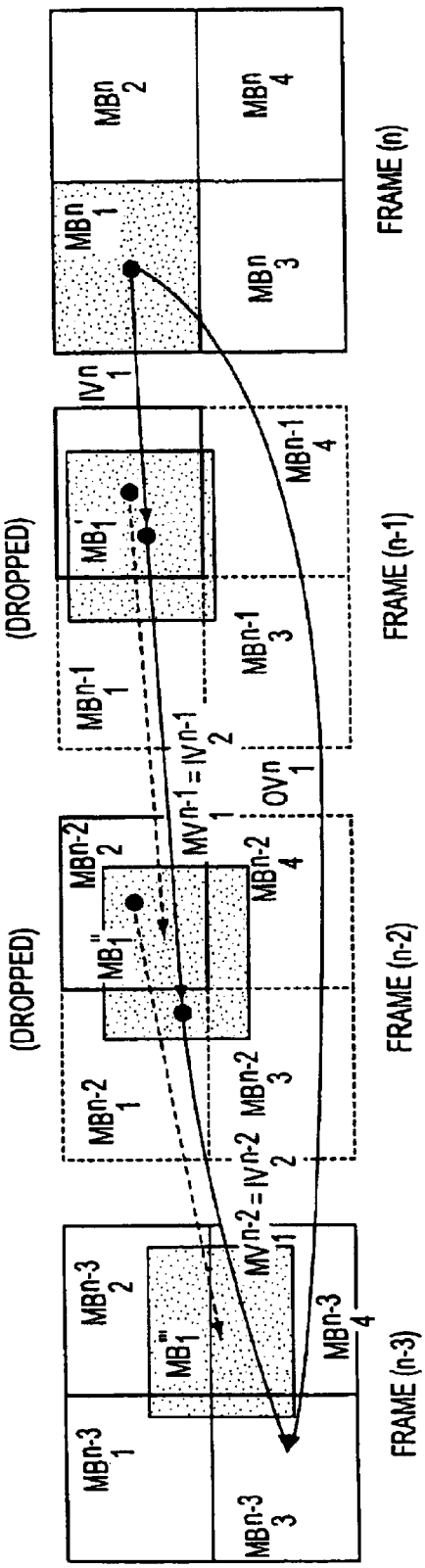
FIG. 5A
FIG. 5B

VIDEO TRANSCODER, VIDEO TRANSCODING METHOD, AND VIDEO COMMUNICATION SYSTEM AND METHOD USING VIDEO TRANSCODING WITH DYNAMIC SUB-WINDOW SKIPPING

FIELD OF THE INVENTION

The present invention relates generally to digital video signal processing, and more particularly, to video communication systems employing transcoding for rate adaptation of video bridging over heterogeneous networks such as multipoint video conferencing, remote collaboration, remote surveillance, video-on-demand, video multicast over heterogeneous networks, and streaming video.

BACKGROUND OF THE INVENTION

Video telephony is an efficient way for business persons, engineers, scientists, etc., to exchange their information at remote locations. With the rapid growth of video telephony, the need for multipoint video conferencing is also growing. A multipoint video conference involves three or more conference participants. In continuous presence video conferencing, each conferee can see all of the other conferees in the same window simultaneously. In such systems, it is necessary to employ a video-bridge to combine the coded video signals from the multiple participants into a single video for display.

FIG. 1 depicts an application scenario of multiple persons participating in a multipoint videoconference with a centralized server. In this scenario, multiple conferees are connected to a central server, referred to as a Multipoint Control Unit (MCU), which coordinates and distributes video and audio streams among multiple participants in a video conference according to the channel bandwidth requirement of each conferee. A video transcoder is included in an MCU to combine the multiple incoming encoded digital video streams from the various conferees into a single coded video bit stream and send the re-encoded video bit-stream back to each participant over the same channel with the required bit rate and format, for decoding and presentation. In the case of a multipoint video conference over the PSTN (Public Switched Telephone Network), e.g. POTS (Plain Old Telephone Service) or ISDN (Integrated Service Digital Network), the channel bandwidth is symmetric. Assuming the conferees have the same channel bandwidth: B Kbps, that is, the MCU receives from the conferees, video at B Kbps each, the MCU combines the video and re-encodes the combined video at B Kbps so as to meet the channel bandwidth requirements for sending back the video to the conferees. Therefore, it is required to perform bit-rate conversion/reduction at the video transcoder. Bit-rate conversion from high bit-rate to low bit-rate in video transcoding will, however, introduce video quality degradation. The visual quality, the computational load, and the used bit-rates need to be traded off in video transcoding to find a feasible solution.

The simplest approach for implementing the transcoder is the use of open-loop transcoding in which the incoming bit-rate is down-scaled by truncating the DCT coefficients, by performing a re-quantization process, or by selecting an arbitrary number of DCT coefficients. Since the transcoding is done in the coded domain, a simple and fast transcoder is possible. However the open-loop transcoder produces an increasing distortion caused by the "drift" problem due to the mismatched reconstructed picture in the encoder and the decoder. The drift error can be eliminated by cascading a decoder and an encoder. In the cascaded transcoder, the decoder decompresses the incoming bit-stream which was encoded at a bit-rate R1, and then the encoder re-encodes the reconstructed video at a lower bit-rate R2. Although the drift error can be eliminated by using the cascaded transcoder, the computational complexity is very high; thus, direct use of a cascaded transcoder is not practical in real-time applications. The cascaded transcoder's complexity, however, can be significantly reduced by reusing some information extracted from the incoming bit-stream, such as motion information and coding mode information.

Keesman et al. (see reference 6 below) introduced simplified pixel-domain and DCT-domain video transcoders based on a motion vector reuse approach to reduce both the computation cost and the memory cost in a cascaded transcoder; however, in such system, the visual quality is degraded due to the non-optimal motion vector resulting from reusing the incoming motion vectors.

Youn et al. (see references 14 and 15 below) proposed efficient motion vector estimation and refinement schemes which can achieve a visual quality close to that of a cascaded transcoder with full-scale motion estimation with relatively small extra computational cost. Several quantization schemes and efficient transcoding architectures have been proposed in references 6–9 below.

Each of the following background references is incorporated by reference herein.

[1] ITU-T Recommendation H.261, "Video codec for audiovisual services at p×64 kbits/s," March 1993.

[2] ITU-T Recommendation H.263, "Video coding for low bit-rate communication," May 1997.

[3] M. D. Polomski, "Video conferencing system with digital transcoding", U.S. Pat. No. 5,600,646

[4] D. G. Morrison, M. E. Nilsson, and M. Ghanbari, "Reduction of the bit-rate of compressed video while in its coded form," in Proc. Sixth Int. Workshop Packet Video, Portland, Oreg., September 1994.

[5] Eleftheriadis and D. Anastassiou, "Constrained and general dynamic rate shaping of compressed digital video," in Proc. IEEE Int. Conf. Image Processing, Washington, D.C., October 1995.

[6] G. Keesman, et al., "Transcoding of MPEG Bitstreams," Signal Processing Image Comm., vol. 8, pp. 481–500, 1996.

[7] G. Keesman, "Method and device for transcoding a sequence of coded digital signals", U.S. Pat. No. 5,729,293

[8] H. Sun, W. Kwok, and J. W. Zdepski, "Architectures for MPEG compressed bitstream scaling,", IEEE Trans. Circuits Syst. Video Technol., vol. 6, pp. 191–199, April 1996.

[9] P. Assuncao and M. Ghanbari, "A frequency-domain video transcoder for dynamic bit-rate reduction of MPEG-2 bit streams," Trans. On Circuits Syst. Video Technol., vol. 8, no. 8, pp. 953–967, 1998.

[10] M. V. Eyuboglu et al., "Efficient transcoding device and method", U.S. Pat. No. 5,537,440

[11] Y. Nakajima et al., "Method and apparatus of rate conversion for coded video data", U.S. Pat. No. 5,657,015

[12] J. Koppelmans et al., "Transcoding device", U.S. Pat. No. 5,544,266

[13] M.-T. Sun, T.-D. Wu, and J.-N. Hwang, "Dynamic bit allocation in video combining for multipoint video

[14] J. Youn, M. -T. Sun, and C. -W. Lin "Motion estimation for high-performance transcoders," IEEE Trans. Consumer Electronics, vol. 44, pp. 649–658, August 1998.

[15] J. Youn, M. -T. Sun and C. -W. Lin, "Adaptive motion vector refinement for high performance transcoding," IEEE Trans. Multimedia, vol. 1, no. 1, pp. 30–40 March 1999.

[16] B. Shen, I. K. Sethi, and V. Bhaskaran, "Adaptive motion-vector resampling for compressed video downscaling," IEEE Trans. Circuits Syst. Video Technol., vol. 9, no. 6, pp. 929–936, September 1999.

[17] ITU-T/SG15, "Video codec test model, TMN8," Portland, June 1997.

[18] Image Procssing Lab, University of British Columbia, "H.263+ encoder/decoder," TMN(H.263) codec, February 1998.

SUMMARY OF THE INVENTION

The present invention provides a multipoint video communication system employing a transcoder with a dynamic sub-window skipping technique to enhance the visual quality of the participants of interest. The system firstly identifies the active conferees from the multiple incoming video streams by calculating the temporal and the spatial activities of the conferee sub-windows. The sub-windows of inactive participants are dropped, and the bits saved by the skipping operation are reallocated to the active sub-windows. Several motion vector composition schemes can be used to compose the unavailable motion vectors in the dropped frames due to limited bit-rates or frame-rates of the user clients in video transcoding. The present invention employs a novel pre-filtered activity-based dominant vector selection (PA-FDVS) scheme because it can provide accurate approximation of motion vectors with lowest computational cost and memory requirement. Simulation results show the visual quality of the active sub-windows is significantly improved at the cost of degrading the temporal resolution of the inactive sub-windows, which degradation is relatively invisible to human perception.

According to a first aspect of the present invention, there is provided a video communication system, comprising:
(a) transcoding means for (i) receiving multiple incoming encoded digital video signals respectively sent over plural transmission paths from a plurality of video devices, (ii) processing the received video signals and (iii) combining the processed video signals into an output video signal comprising a single coded video bit stream, respective portions of the output video signal corresponding to the video signals sent from the plurality of video devices constituting sub-windows of the output video signal; and (ii) (b) means for transmitting the output video signal through the transmission paths to the plurality of video devices, respective portions of the output video signal corresponding to the video signals sent from the plurality of video devices constituting sub-windows of the output video signal;
wherein the transcoding means comprises:
means for classifying the sub-windows into active sub-windows and static sub-windows; and
means for generating the output video signal by
(1) transcoding frames of the active sub-windows while skipping transcoding of frames of the static sub-windows and substituting a latest corresponding encoded sub-window for a skipped sub-window to approximate the skipped sub-window, and
(2) obtaining outgoing motion vectors of the output video signal from incoming motion vectors of the active sub-windows and the static sub-windows by summing motion vectors of the skipped static sub-windows and by obtaining a motion vector of a non-aligned macroblock which is not aligned with segmented macroblock boundaries in the sub-windows by a dominant vector selection operation comprising pre-filtering out unreliable neighboring motion vectors of the segmented macroblock boundaries and selecting the one of the segmented macroblock boundaries having the largest overlapping activity as the dominant block, and selecting the motion vector of the dominant block as the motion vector of the non-aligned macroblock.

The prefiltering operation may comprise determining whether a strongly overlapping dominant block exists among the segmented macroblocks. The operation of determining whether a strongly overlapping dominant block exists among the segmented macroblocks may comprise calculating the largest overlapping area of each of the segmented macroblocks with the non-aligned macroblock, and if the largest overlapping area of one of the segmented macroblocks is greater than a predetermined threshold, then selecting the motion vector of the one of the segmented macroblocks with the largest overlapping area as the dominant vector, and if the largest overlapping area is not greater than the predetermined threshold, then: setting an initial candidate list as the four neighboring motion vectors {$IV_1$, $IV_2$, $IV_3$, $IV_4$} of the four segmented macroblocks, calculating the mean and the standard deviation of the four neighboring motion vectors in accordance with the relation:

$$IV_{mean} = \frac{1}{4} \sum_{i=1}^{4} IV_i$$

$$IV_{std} = \sqrt{\frac{1}{4} \sum_{i=1}^{4} (IV_i - IV_{mean})^2}$$

for i=1 to 4,
if $|IV_i - IV_{mean}| > k_{std} \cdot IV_{std}$, removing $IV_i$ from the candidate list as unreliable, and if not, keeping $IV_i$ in the candidate list as reliable.

The largest overlapping activity determining operation may comprise, for each motion vector on the candidate list, calculating an area-activity product $A_i \cdot ACT_i$, i=1,2,3,4, where $A_i$ is the overlapping area with the segmented macroblock and $ACT_i$ is the activity measure, and
selecting the dominant vector as the motion vector of the one of the segmented macroblocks with the largest area-activity product.

The means for classifying may operate such that it calculates a sum for each of the sub-windows of the magnitude of its motion vectors, compares the sum with a threshold, and classifies the sub-window as active or static in accordance with a comparison result.

The means for processing may operate such that it obtains the outgoing motion vectors by, after a frame of a static sub-window is skipped, composing motion vectors of each skipped and non-skipped sub-window relative to its corresponding latest encoded sub-window.

According to another aspect of the present invention there is provided a video communication method comprising:
  receiving multiple incoming encoded digital video signals respectively sent over plural transmission paths from a plurality of video devices;
  processing the received video signals;
  combining the processed video signals into an output video signal comprising a single coded video bit streams and
  transmitting the output video signal through the transmission paths to the plurality of video devices, respective portions of the output video signal corresponding to the video signals sent from the plurality of video devices constituting sub-windows of the output video signal;
  wherein the processing step comprises:
    classifying the sub-windows into active sub-windows and static sub-windows; and
    generating the output video signal by
      (1) transcoding frames of the active sub-windows while skipping transcoding of frames of the static sub-windows and substituting a latest corresponding encoded sub-window for a skipped sub-window to approximate the skipped sub-window, and
      (2) obtaining outgoing motion vectors of the output video signal from incoming motion vectors of the active sub-windows and the static sub-windows by summing motion vectors of the skipped static sub-windows and by obtaining a motion vector of a non-aligned macroblock which is not aligned with segmented macroblock boundaries in the sub-windows by a dominant vector selection operation comprising pre-filtering out unreliable neighboring motion vectors of the segmented macroblock boundaries and selecting the one of the segmented macroblock boundaries having the largest overlapping activity as the dominant block, and selecting the motion vector of the dominant block as the motion vector of the non-aligned macroblock.

The prefiltering step may comprise determining whether a strongly overlapping dominant block exists among the segmented macroblocks and the step of determining whether a strongly overlapping dominant block exists among the segmented macroblocks may comprise calculating the largest overlapping area of each of the segmented macroblocks with the non-aligned macroblock, and if the largest overlapping area of one of the segmented macroblocks is greater than a predetermined threshold, then selecting the motion vector of the one of the segmented macroblocks with the largest overlapping area as the dominant vector, and if the largest overlapping area is not greater than the predetermined threshold, then: setting an initial candidate list as the four neighboring motion vectors $\{IV_1, IV_2, IV_3, IV_4\}$ of the four segmented macroblocks, calculating the mean and the standard deviation of the four neighboring motion vectors in accordance with the relation:

$$IV_{mean} = \frac{1}{4}\sum_{i=1}^{4} IV_i$$

$$IV_{std} = \sqrt{\frac{1}{4}\sum_{i=1}^{4}(IV_i - IV_{mean})^2}$$

for i=1 to 4,
  if $|IV_i - IV_{mean}| > k_{std} \cdot IV_{std}$, removing $IV_i$ from the candidate list as unreliable, and if not, keeping $IV_i$ in the candidate list as reliable, and the step of determining the largest overlapping activity may comprise, for each motion vector on the candidate list, calculating an area-activity product $A_i \cdot ACT_i$, i=1,2,3,4, where $A_i$ is the overlapping area with the neighboring block (i) and $ACT_i$ is the activity measure, and the method may further comprise selecting the dominant vector as the motion vector of the one of the segmented macroblocks with the largest area-activity product.

The classifying step may comprise calculating a sum for each of the sub-windows of the magnitude of its motion vectors, comparing the sum with a threshold, and classifying the sub-window as active or static in accordance with a comparison result.

The processing step may comprise obtaining the outgoing motion vectors by, after a frame of a static sub-window is skipped, composing motion vectors of each skipped and non-skipped sub-window relative to its corresponding latest encoded sub-window.

BRIEF DESCRIPTION OF THE DRAWINGS

FIGS. 5(a) and (b) show two dominant vector selection schemes: (a) BDVS and (b) FDVS.

DETAILED DESCRIPTION OF THE PREFERRED EMBODIMENTS

Figure 14A:
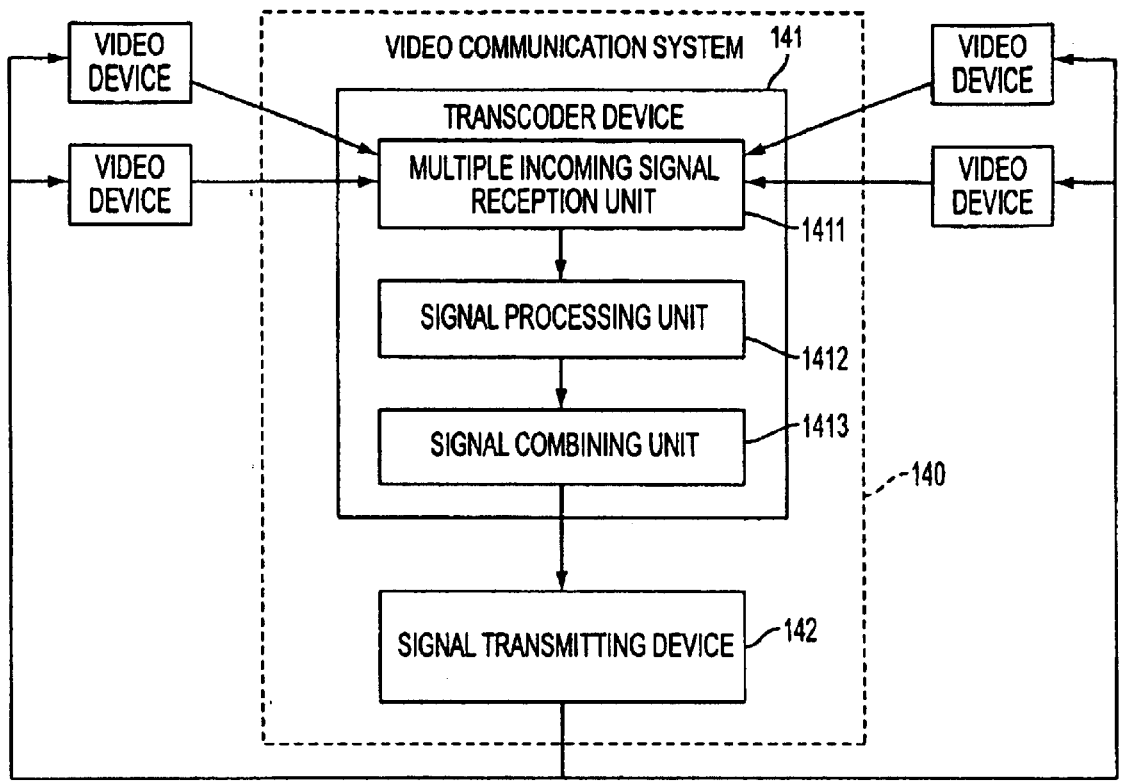
FIGS. 14(a) and 14(b) illustrate the multipoint video system of the present invention in block diagram or flow chart format.
Figure 14B:
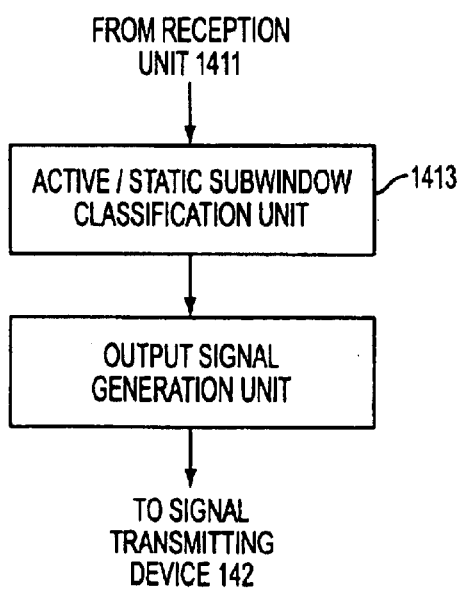

FIGS. 14(a) and 14(b) illustrate a preferred embodiment of the present invention.

In FIG. 14(a), video communication system 140 includes transcoder device 141 and signal transmitting device 142. Transcoder device 141 includes reception unit 1411 which receives multiple incoming encoded digital video signals respectively sent over plural transmission paths from a plurality of video devices 143 participating in a video conference. Device 141 also includes a signal processing unit 1412 which processes the received video signals and a combining unit 1413 which combines the processed video signals into an output video signal constituting a single coded video bit stream. Respective portions of the output video signal corresponding to the video signals sent from the plurality of video devices 143 constitute sub-windows of the output video signal.

Figure 1:
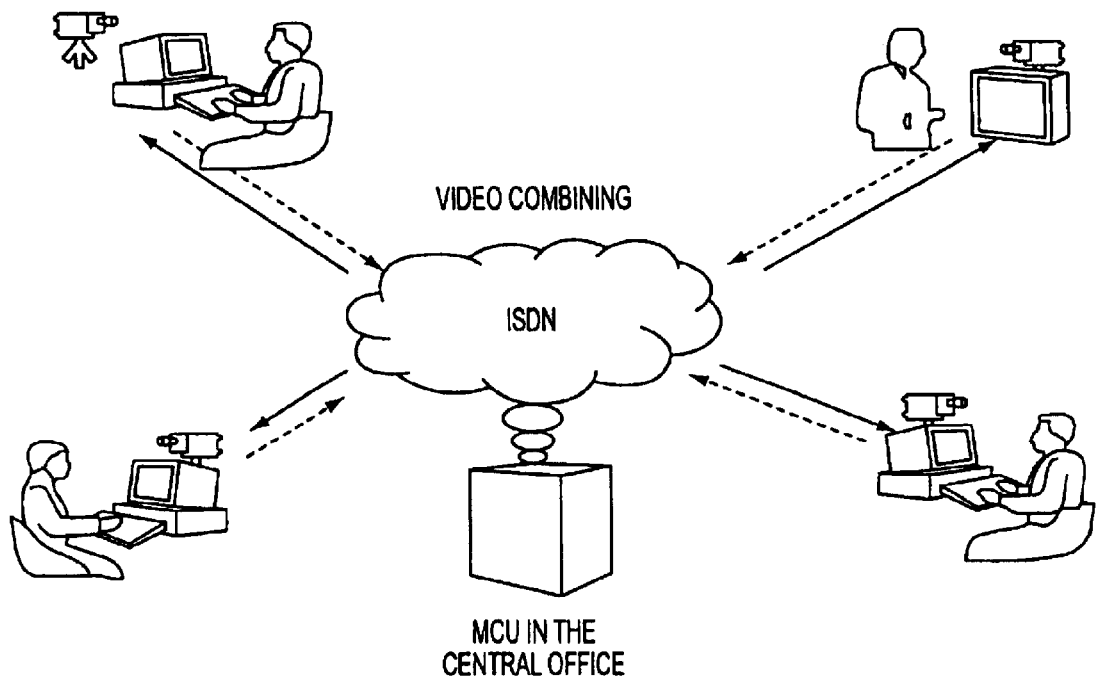
FIG. 1 is an application example of a multipoint video communication system.

As shown in FIG. 14(b), signal processing unit 1412 includes an active/static sub-window classification unit 1414 which classifies the sub-windows into active sub-windows and static sub-windows and a output signal generation unit 1415 which generates the output video signal by (1) transcoding frames of said active sub-windows while skipping transcoding of frames of the static sub-windows and substituting a latest corresponding encoded sub-window for a skipped sub-window to approximate the skipped sub-window, and (2) obtaining outgoing motion vectors of the output video signal from incoming motion vectors of the active sub-windows and the static sub-windows by obtaining a motion vector of a non-aligned macroblock, which is not aligned with segmented macroblock boundaries in the sub-windows, by a dominant vector selection operation comprising pre-filtering out unreliable motion vectors of the segmented macroblock boundaries and selecting the one of the segmented macroblock boundaries having the largest overlapping activity as the dominant block, and selecting the motion vector of the dominant block as the motion vector of the non-aligned macroblock. It should be noted that, although FIG. 14 shows separate lines for uplink and downlink between a video device 143 and multipoint video conferencing unit 140, these lines are in the same channel, as in FIG. 1. It should be noted that the system of FIGS. 14(a) and 14(b) may be used for such diverse applications as multipoint video conferencing, remote collaboration, remote surveillance, video-on-demand, video multicast over heterogeneous networks, and streaming video.

The operation of the system of FIGS. 14(a) and 14(b) will be explained more fully below.

By way of further background, in multipoint video conferencing, most of the time, only one or two persons are motion active at one time. Since the active conferees usually have larger motion than others, the sub-windows containing the active conferees are often the center of focus. In the dynamic sub-window skipping (DSWS) system according to the present invention, frames of those sub-windows which are classified as inactive or static may be skipped from transcoding so that the saved bits can be used to enhance the quality of the remaining non-skipped active sub-windows. In this method, the incoming motion vectors and the associated motion-compensated residuals. are used to calculate the temporal and the spatial activities respectively for dynamic sub-window skipping control. The decision rule is described as follows:

$$\text{if } (S_m^{MV} < TH_{MV1}) \&\& \left( \frac{SAD_m - SAD_m^{prev}}{SAD_m^{prev}} < TH_{SAD1} \right)$$

then
  Skip the mth sub-window
else
  Encode the mth sub-window
where the sum of the motion vectors of the nth macroblock in the mth sub-window is defined as $$S_{m,n}^{MV} = |MV_{m,n}^x| + |MV_{m,n}^y|. \tag{1}$$

and the sum of the magnitude of the motion vectors of the mth sub-window is $$S_m^{MV} = \sum_{n=1}^{N} S_{m,n}^{MV} \tag{2}$$

The sums of absolute difference (SAD) of the macroblock level and the sub-window level are defined respectively as follows:

$$SAD_{m,n} = \sum_{x,y \in MB_{m,n}} |f_m(x, y) - f_m^{prev}(x + MV_{m,n}^x, y + MV_{m,n}^y)|, \tag{3}$$

$$SAD_m = \sum_{n=1}^{N} SAD_{m,n}. \tag{4}$$

where $(MV_{m,n}^x, MV_{m,n}^y)$ is the motion vector associated with the nth macroblock of the mth sub-window with respect to its corresponding latest encoded sub-window (i.e., $f_m^{prev}(\cdot)$).

Given that some previous incoming sub-windows may be dropped with the DSWS method, the incoming motion vectors may not be valid for use in the outgoing bit stream since they may point to the dropped sub-windows that do not exist in the transcoded bit-stream. To trace the motion vectors along the skipped sub-windows, the motion vector composition schemes discussed below can be utilized to compose the motion vectors of each skipped and non-skipped sub-window with respect to its corresponding latest encoded sub-window, once some sub-window is skipped.

The sum of the magnitude of the motion vectors of a sub-window indicates its motion activity. A sub-window is classified as active if the sum is larger than a predetermined threshold, otherwise it is classified as static. A static sub-window is considered to be skipped and, once it is skipped, the corresponding latest un-skipped sub-window is repeated in its place to approximate the skipped sub-windows. Human visual perception is relatively insensitive to the small difference between the skipped sub-window and its reconstructed one from sub-window repetition if the sub-window is static.

The thresholds, THMV1 and THSAD1, are set as the border for classification. The larger the thresholds are set, the more the sub-windows will be skipped, and the more the saved bits will be used in other sub-windows. However, jerky motions will become more serious the more the sub-windows are skipped.

The SAD value of each sub-window is used to constrain the frame skipping. If the current sub-window is static but the accumulated residual is larger than a threshold, the system of the present invention enforces that the sub-window, which would otherwise be skipped, be encoded. This measure can prevent error accumulation which would result from using only the motion activity measure. It should be noted that, once a sub-window is skipped, the computational saving is achieved since no transcoding operation is required for the skipped sub-windows.

Figure 2:
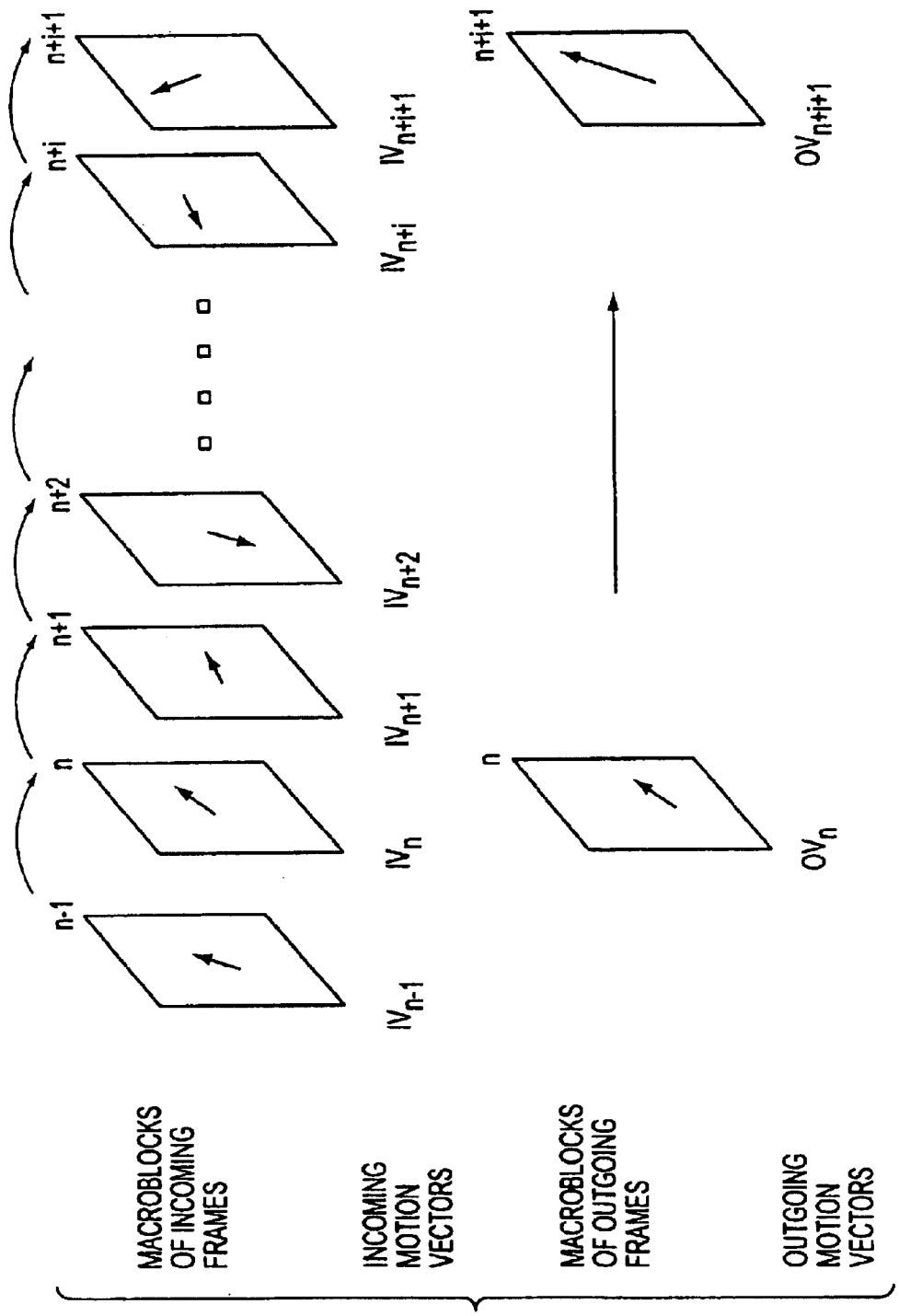
FIG. 2 shows motion vectors with frame skipping.

FIG. 2 illustrates a situation where frames from (n+1) to (n+i) are dropped in transcoding. The incoming motion vectors are not valid when they point to the dropped frames which do not exist in the transcoded bit-stream. In this case, the outgoing motion vectors after frame skipping can be obtained from the history of the incoming motion vectors of the skipped and the non-skipped frames. For example, with the sequence of the incoming motion vectors {IVn+1, IVn+2, . . . , IVn+i}, the outgoing motion vector for the (n+i+1)th frame can be obtained as follows:

$$OV_{n+i+1} = \sum_{k=1}^{i+1} IV_{n+k} \qquad (5)$$

Figure 3:
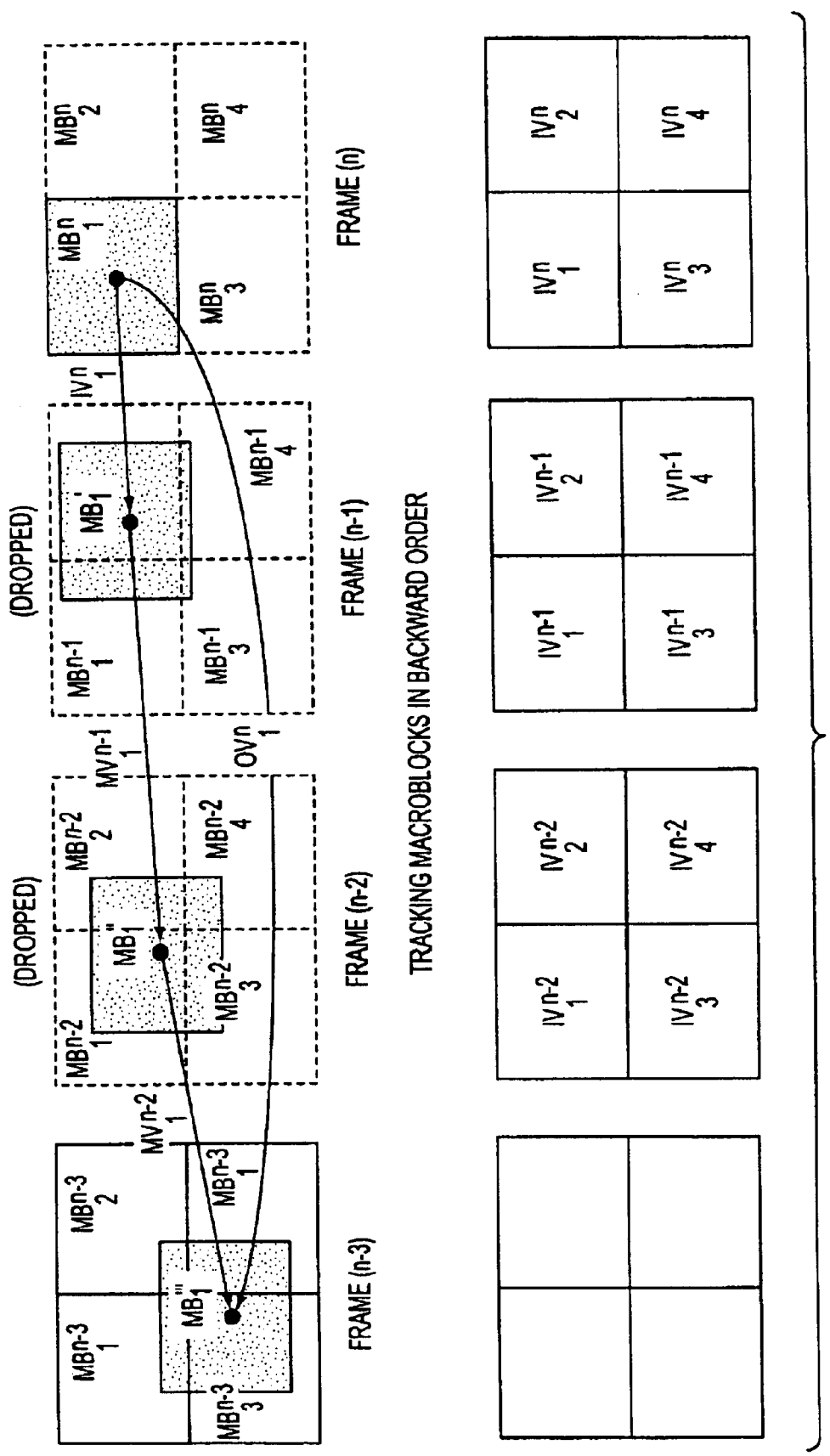
FIG. 3 shows backward motion vector tracing.

For example, in FIG. 3, a situation where two frames are dropped is illustrated. The block pointed by motion vector $IV_1^n$, block $MB_1'$ does not exist in the outgoing bit-stream when frame (n−1) is dropped; the same applies to block $MB_1''$. Furthermore, block $MB_1''$ was predicted using block $MB_1'''$, which was pointed by motion vector $IV_1^{n-2}$, while block $MB_1'$ was predicted-using block $MB_1''$ which was pointed by motion vector $IV_1^{n-1}$. Therefore, after frame skipping, block $MB_1$ should be predicted using block $MB_1'''$, pointed by motion vector $OV_1^n$ effectively, and it should be noted that the desired motion vector for block $MB_1$ should be $OV_1^n = IV_1^n + MV_1^{n-1} + MV_1^{n-2}$, instead of the incoming motion vector $IV_1^n$.

It should be noted that, although the outgoing motion vectors can be obtained by summing up the motion vectors in the dropped frames using the technique of reference 5 above, there is still another problem in that the motion vectors of the macroblocks which are not aligned with the segmented macroblock boundaries are not available in the incoming bit-stream. For example, in FIG. 3, $MV_1^{n-1}$ and $MV_1^{n-2}$ do not exist in the incoming bit-stream since $MB_1'$ and $MB_1''$ are not aligned with the segmented macroblock boundary. Thus, they need to be either re-estimated using motion estimation schemes or composed using the motion information of the neighboring anchor blocks.

Figure 4:
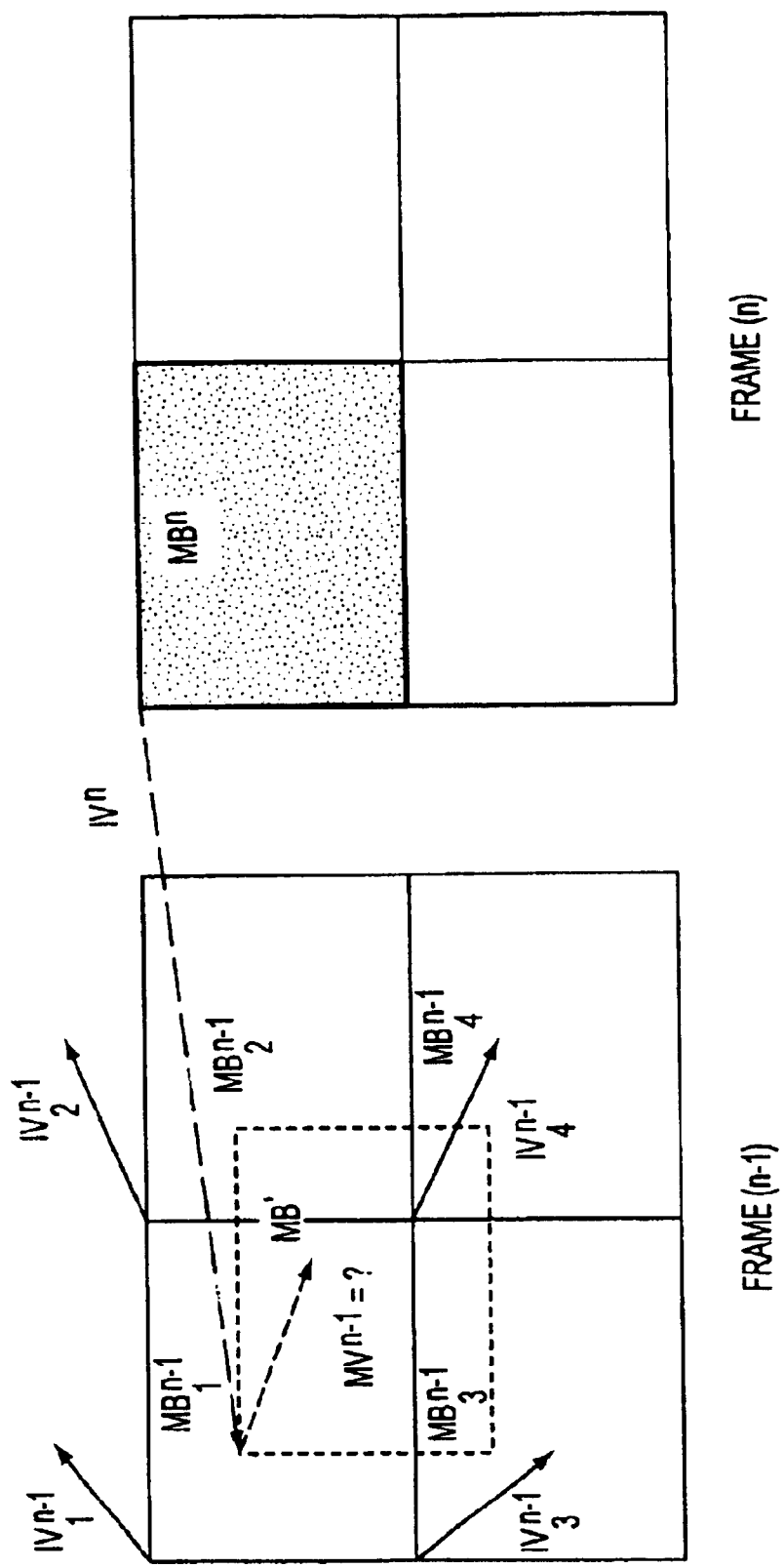
FIG. 4 shows motion vector composition from the neighboring blocks' motion information.

FIG. 4 illustrates the problem of motion vector composition. In FIG. 4, the current block MBn is predicted from the block MB' in the previous frame pointed by the motion vector IVn. The block MB' is generally not aligned to the macroblock boundary; thus, its motion vector $MV^{n-1}$ does not exist in the incoming bit-stream. Instead, the only available information includes the motion vectors of the four neighboring anchor blocks on the macroblock boundary, which are carried in the incoming bit-stream. When a block is not aligned to the macroblock boundary on both horizontal and vertical directions, it will overlap with four anchor blocks with the corresponding motion vectors $\{IV_1^{n-1}, IV_2^{n-1}, IV_3^{n-1}, IV_4^{n-1}\}$. The present inventor has investigated the methods of composing the motion vector $MV^{n-1}$ from $\{IV_1^{n-1}, IV_2^{n-1}, IV_3^{n-1}, IV_4^{n-1}\}$, that is, $MV^{n-1}=f(IV_1^{n-1}, IV_2^{n-1}, IV_3^{n-1}, IV_4^{n-1})$.

There are several drawbacks with the interpolation scheme reported in reference 16 above. First, for consecutively dropped frames, the interpolation should be processed in backward order starting from the last dropped-frame to the first dropped frame. This backward processing requires all motion vectors of the dropped frames to be stored, which requires much extra memory. Another drawback of the interpolation scheme is inaccuracy of the resultant motion vector. In spite of proper weighting of each anchor motion vector based on overlapping areas and activities, unreliable motion vectors can be produced because the area covered by four blocks may be too divergent and too large to be described by a single motion. The interpolation of these diverse motion flows thus may not produce an accurate motion vector.

In reference 15 above, an area-based dominant vector selection (DVS) method was proposed to compose and trace the un-available motion vectors in the dropped frames. Instead of interpolation from four neighboring motion vectors, the DVS method selects one dominant motion vector from the four neighboring blocks. A dominant motion vector is defined as a motion vector carried by a dominant block. And the dominant block is defined as the anchor block which overlaps the block pointed by the incoming motion vector the most.

FIGS. 5(a) and (b) depict two types of DVS schemes: the backward DVS (BDVS) method and the forward DVS (FDVS) method for the two-frame skipping case shown in FIG. 5. FIG. 5(a) illustrates the motion vector composition and tracing procedure of BDVS. As mentioned above, $MV_1^{n-1}$ and $MV_1^{n-2}$ are not carried in the incoming bit-streams thus, they need to be composed. Define DV(·) as a function to find the dominant motion vector. In FIG. 5(a):

$$MV_1^{n-1}=DV(MB_1')=DV(MB_1''+MV_1^n)=IV_2^{n-1}, \qquad (6)$$

and $$MV_1^{n-2}=DV(MB_1'')=DV(MB_1'+MV_1^{n-1})=DV(MB_1''+MV_1^{n-1}+MV_1^n)=IV_1^{n-2} \qquad (7)$$

Thus, the resultant output motion vector of $MB_1^n$ in frame (n) with respect to the non-dropped frame (n−3) becomes $$OV_1^n+IV_1^n+IV_2^{n-1}+IV_1^{n-2} \qquad (8)$$

The above equations can be expressed in a recursive form as follows:

$$MV_i^{n-m} = DV\left(MB_i^n + \sum_{j=0}^{m-1} MV_i^{n-j}\right), \quad m=1,\ldots,M \text{ and} \qquad (9)$$

$$OV_i^n = \sum_{j=0}^{M} MV_i^{n-j} \qquad (10)$$

The BDVS scheme, however, still has to be processed in the backward order. As mentioned above, this will require extra memory to store all the incoming motion vectors of the dropped frames, and will also introduce delay in composing and tracing back all the unavailable motion vectors. By slightly modifying the BDVS method, above reference 15 proposed an FDVS scheme which is able to compose the motion vectors in the forward order. In the BDVS method, the dominant blocks are located using the iteratively accumulated motion vectors originated from the anchor blocks of the current non-skipped frame (e.g., using $IV_1^n$, $IV_1^n+IV_2^{n-1}$, and $IV_1^n+IV_2^{n-1}+IV_1^{n-2}$ originated from $MB_1^n$ to find the dominant blocks $MB_2^{n-1}$ for $MB_1'$, $MB_1^{n-2}$ for $MB_1''$, and the final reference block $MB_1'''$, respectively). On the other hand, the FDVS. scheme iteratively locates the dominant blocks of frame (n−1) using the dominant blocks and the associated dominant vector found in frame (n). For example, in FIG. 5(b), the dominant block of $MB_1'$ pointed by $IV_1^n$ is $MB_2^{n-1}$, then the dominant block in frame (n−2) is located by finding the reference block $MB_1'''$ pointed by the dominant vector $IV_2^{n-1}$ from the dominant block $MB_2^{n-1}$ in frame (n−1) (not pointed by vector $IV_1^n+IV_2^{n-1}$ from $MB_1''$), and so forth. With this approach, the dominant blocks of all the frames prior to frame (n) can be fully determined from the dominant blocks and the associated dominant vectors information of frame (n) without the need of knowing the relevant information in the frames after frame (n). This feature makes it possible to perform the motion vector composition process in the forward order. For example, in FIG. 5(b), when processing frame (n−2), the incoming motion vectors $(IV_i^{n-2}, IV_2^{n-2}, IV_3^{n-2}, IV_4^{n-2})$ are stored in a table. Then the system proceeds to process frame (n−1). Since the second macroblock in frame (n−2) becomes the dominant macroblock of the second macroblock in frame (n−1), the dominant motion vector is selected from the table at the location of the second macroblock, and then is added to the current incoming motion vector corresponding to the current second macroblock. Then, the table is updated with the new composed value. In FIG. 5(b), the resultant motion vector for the second macroblock at frame (n−1) will be $IV_2^{n-2}+IV_2^{n-1}$. When the frame (n) is processed, the composed motion vector for the first macroblock at frame (n) will be set at $[IV_2^{n-2}+IV_2^{n-1}]+IV_1^n$ because the stored value in the table for the dominant block pointed by $IV_1^n$, will be the dominant motion vector of $MB_1'$ as shown in FIG. 5(b). Using this scheme, only one table is needed for all the dropped frames, as opposed to multiple tables needed for the interpolation scheme and the BDVS scheme.

If there is no strongly dominant block which overlaps the reference block with significantly largest area (e.g., the overlapping area is larger than a predefined threshold, for example, 80% of the block area), selecting a dominant vector which diverges largely from the other neighboring motion vectors may degrade the quality since the motion vector may be unreliable.

To solve this problem, the present invention pre-filters out the unreliable neighboring motion vectors if no strongly dominant block is found. Furthermore, in dominant vector selection, the "largest overlapping area" may not be the best criteria when the overlapping areas of some of the neighboring anchor blocks are close. In this case, the present invention selects the neighboring anchor block with the largest overlapping energy or activity as the dominant block. The present invention uses the activity measure defined in reference 11 above:

$$ACT_i = \sum_{j \notin DC} |Coef_{i,j}| \quad (11)$$

Figure 13:
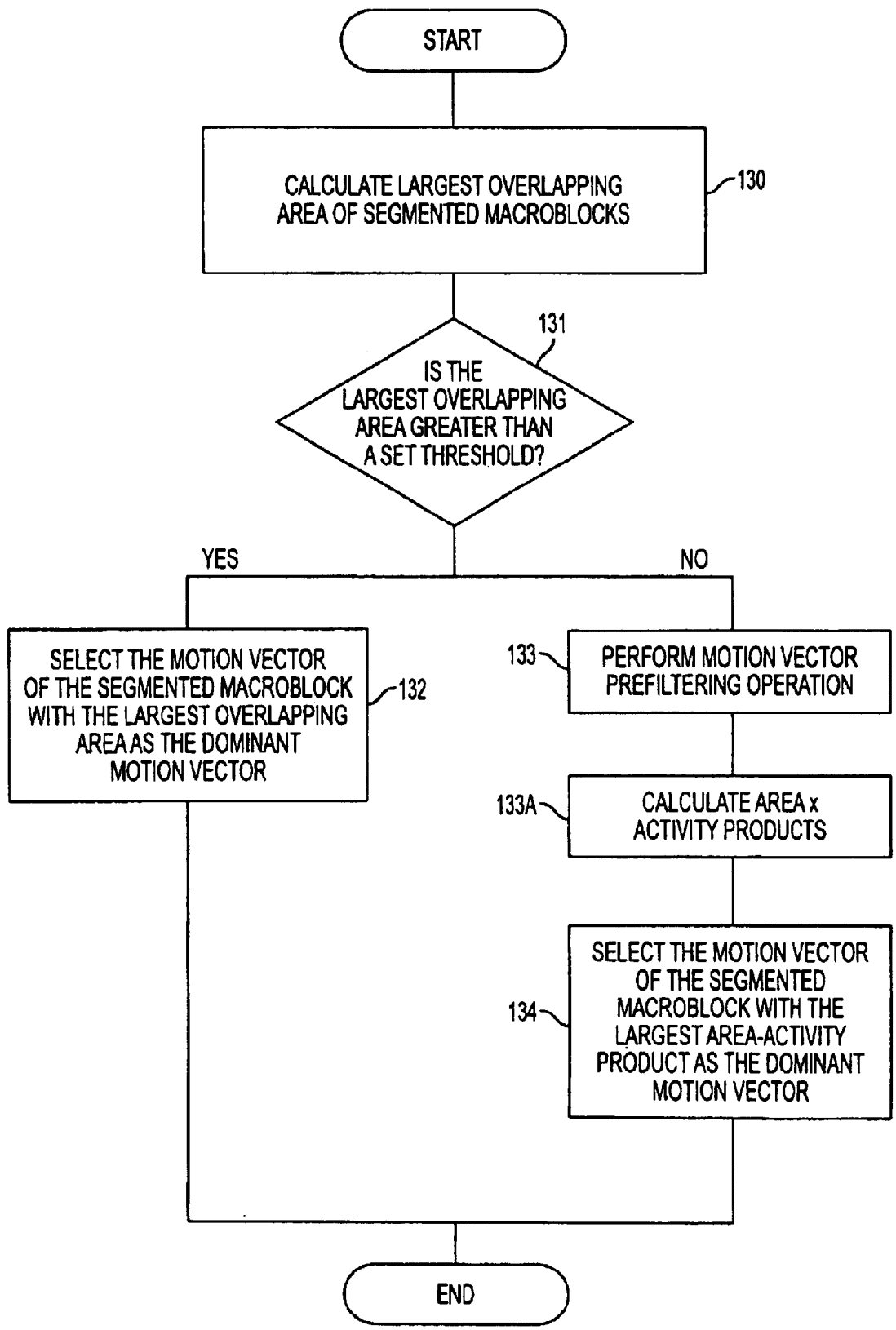
FIG. 13 illustrates the pre-filtered activity-based VS scheme (PA-BDVS and PA-FDVS) of the present invention.

The pre-filtered activity-based DVS scheme (PA-BDVS and PA-FDVS) of the present invention is illustrated in FIG. 13, in which:

Step 130 involves calculating the largest overlapping area of the segmented macroblocks or anchor blocks with the non-aligned macroblock. Step 131 involves determining if the largest overlapping area is greater than a predetermined threshold. Then, if so, in step 132, select the motion vector of the segmented macroblock or anchor block with the largest overlapping area as the dominant vector, and if not, in step 133, perform the following motion vector pre-filtering procedure:

(a) Set the initial candidate list as the four neighboring motion vectors $\{IV_1, IV_2, IV_3, IV_4\}$ of the segmented macroblocks.

(b) Calculate the mean and the standard deviation of the four neighboring motion vectors as follows:

$$IV_{mean} = \frac{1}{4}\sum_{i=1}^{4} IV_i$$

$$IV_{std} = \sqrt{\frac{1}{4}\sum_{i=1}^{4}(IV_i - IV_{mean})^2}$$

for i=1 to 4 if $|IV_i - IV_{mean}| > k_{std} \cdot IV_{std}$ $IV_i$ is unreliable, remove it from the candidate list else $IV_i$ is reliable, keep it in the candidate list, and (c) in step 133A, for the motion vectors in the candidate list, calculate the four area-activity products $Ai \cdot ACTi$, i=1,2,3,4, where Ai is the overlapping area with the segmented macroblock (i) and ACTi is the activity measure as defined in reference 11 above.

Then, in step 134, select the motion vector of the segmented macroblock with the largest area-activity product as the dominant motion vector.

SIMULATION RESULTS OF THE PRESENT INVENTION

Figure 6A:
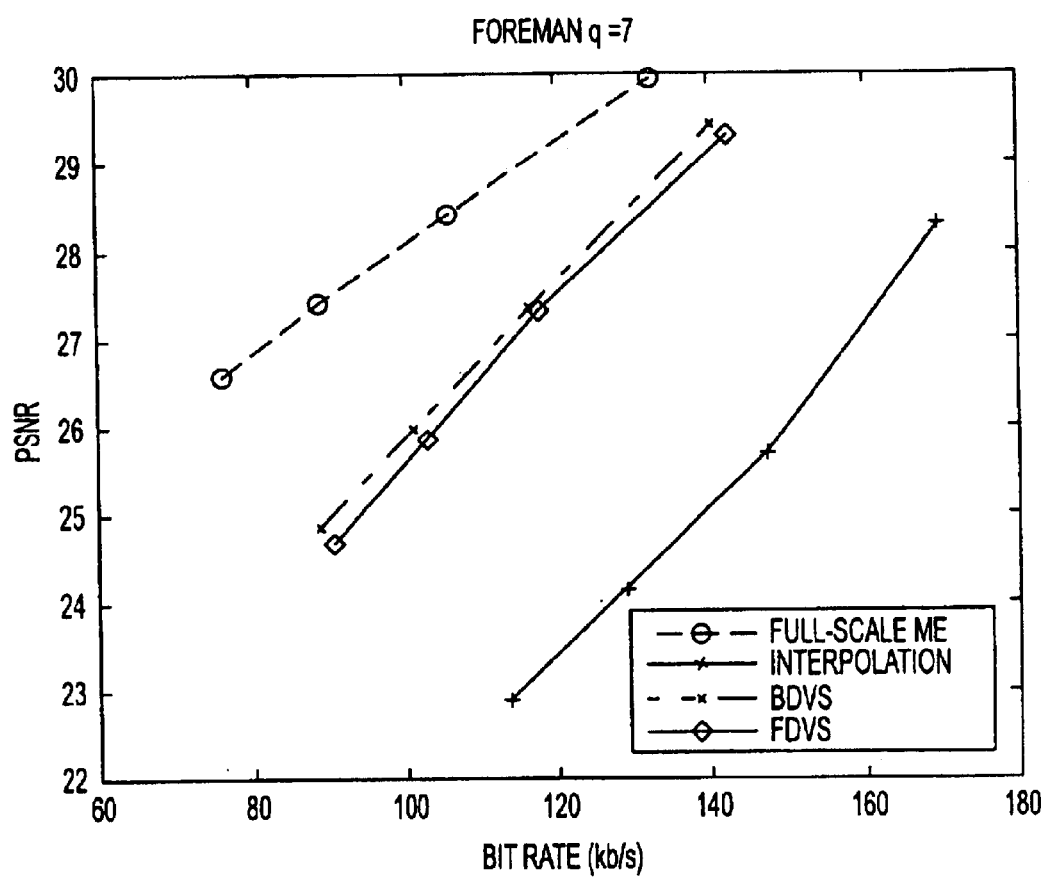
FIGS. 6(a)–(c) show a PSNR-rate plot of various motion vector estimation and composition schemes with "foreman" sequence, where the incoming bit-stream was encoded using a quantization step-size of Q and transcoded into different frame rates (15, 10, 7.5, and 6 fps) using the same quantization step-size: (a) Q=7; (b) Q=10; (c) Q=15.
Figure 6B:
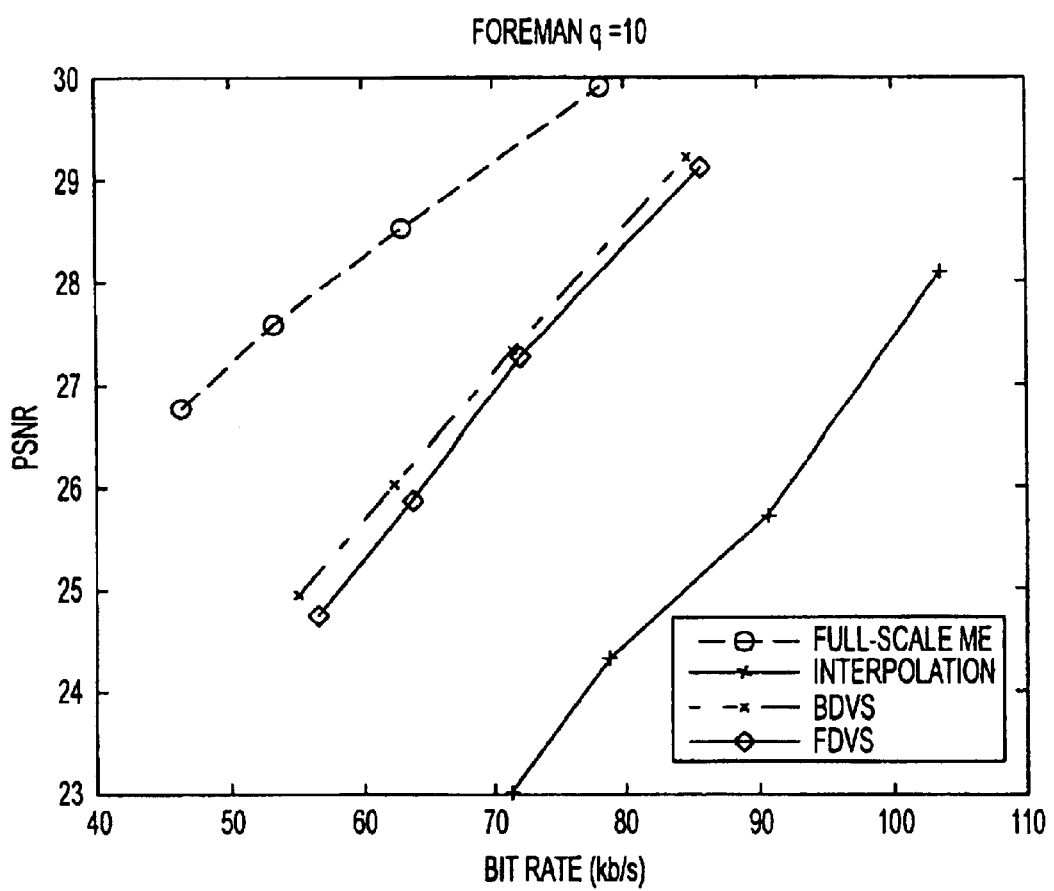
Figure 6C:
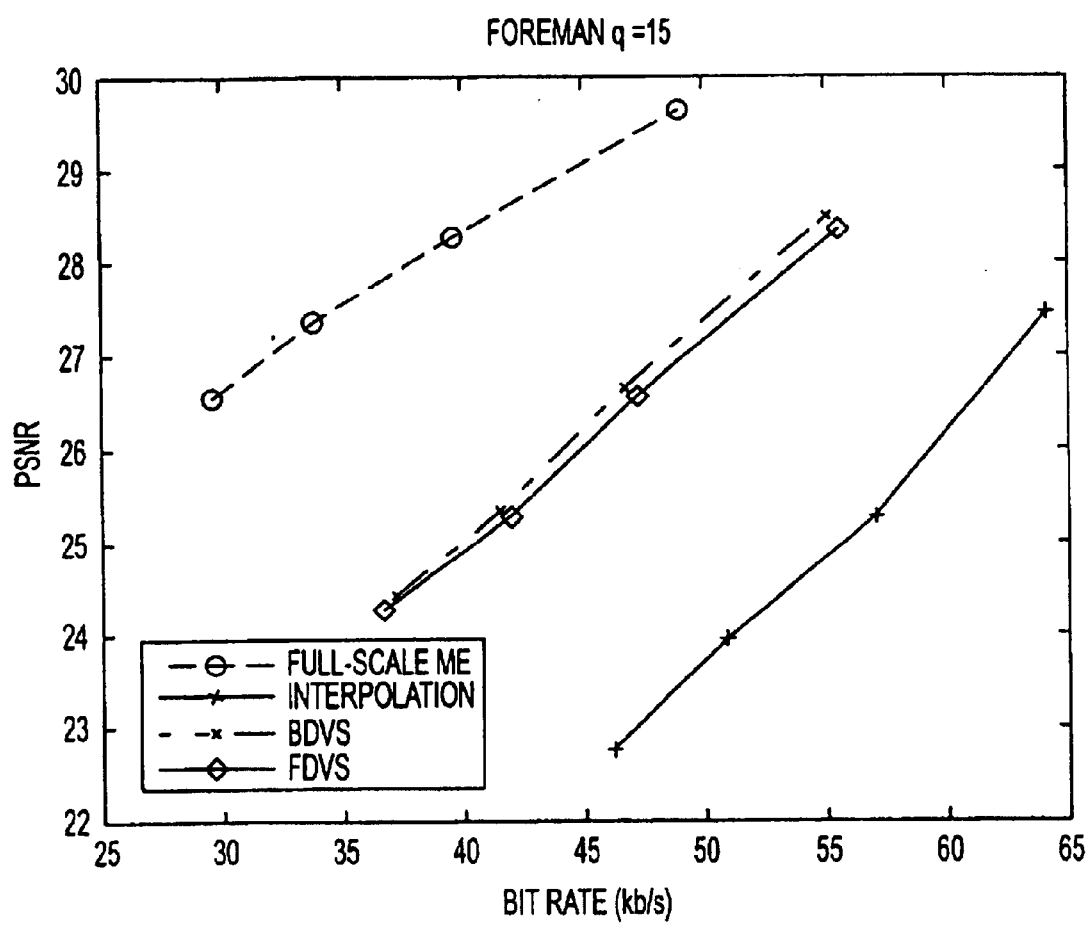

The performances of the full-scale motion estimation method (full-search estimation was adopted) and the motion vector composition methods (interpolation, BDVS and FDVS methods) are compared in FIGS. 6(a)–(c). In FIG. 6(a), a test sequence 'foreman' was encoded with 30 fps using a quantization step-size of 7, and then transcoded with different frame-rates. The frame-rate of the outgoing bitstream was changed to (incoming frame-rate)/(distance of dropped-frames). For example, if the distance between the dropped frames is 2, then it implies the outgoing frame-rate is 15 (=30/2). Furthermore, the same quantization step-size of 7 was used for outgoing quantization step-size. The bit-rates used for temporal transcoding with different frame rates and the resultant PSNR values are calculated, and the PNSR-rate pairs form the plot in FIG. 6(a). As shown in FIG. 6(a), the DVS schemes significantly outperform the interpolation scheme at various outgoing frame-rates and bit-rates.

FIGS. 6(b) and (c) depict the simulation results for the other two quantization step-sizes of 10 and 15. The figures indicate that the DVS schemes also outperform the interpolation scheme at various quantization step-sizes. The performance difference between BDVS and FDVS is rather small at higher frame rates and becomes larger if the number of skipped frames increases. It is not sensitive to the quantization step-size change.

Figure 7A:
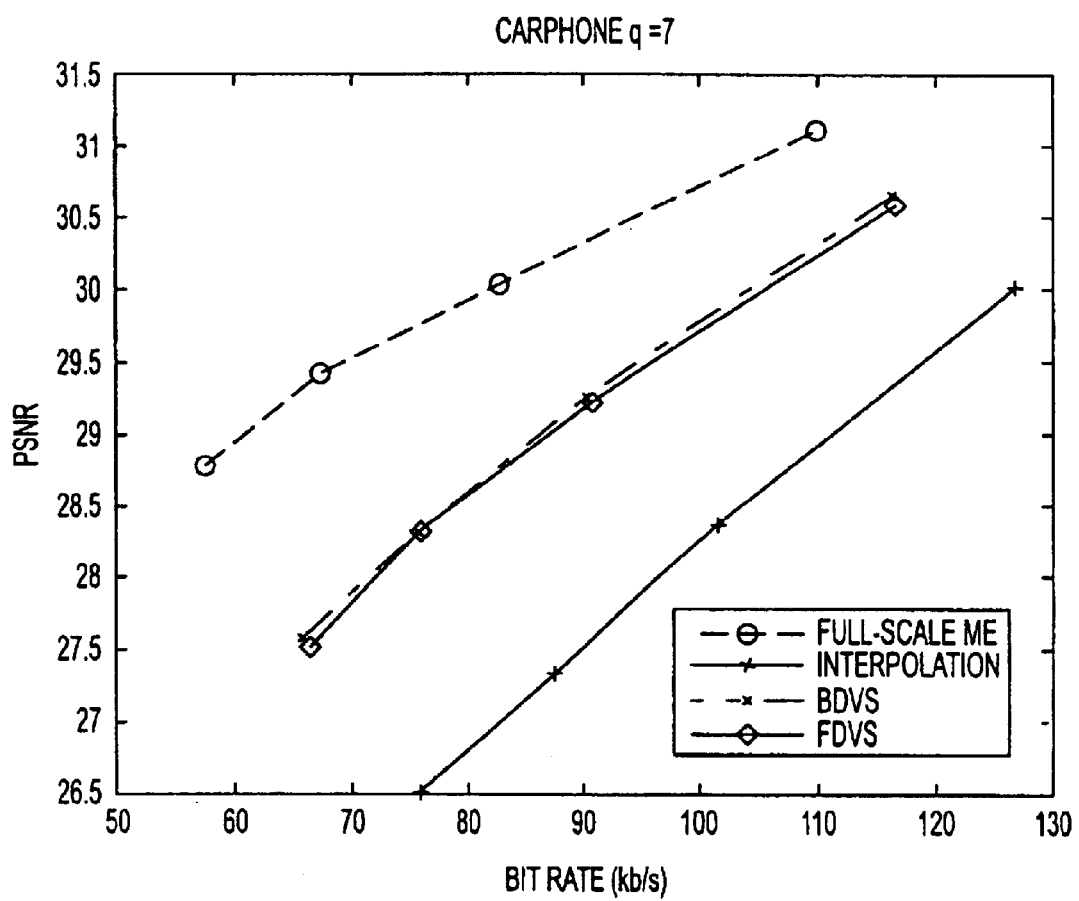
FIGS. 7(a)–(c) show PSNR-rate plots of various motion vector estimation and composition schemes with "carphone" sequence, where the incoming bit-stream was encoded using a quantization step-size of Q and transcoded into different frame rates (15, 10, 7.5, and 6 fps) using the same quantization step-size: (a) Q=7; (b) Q=10; (c) Q=15
Figure 7B:
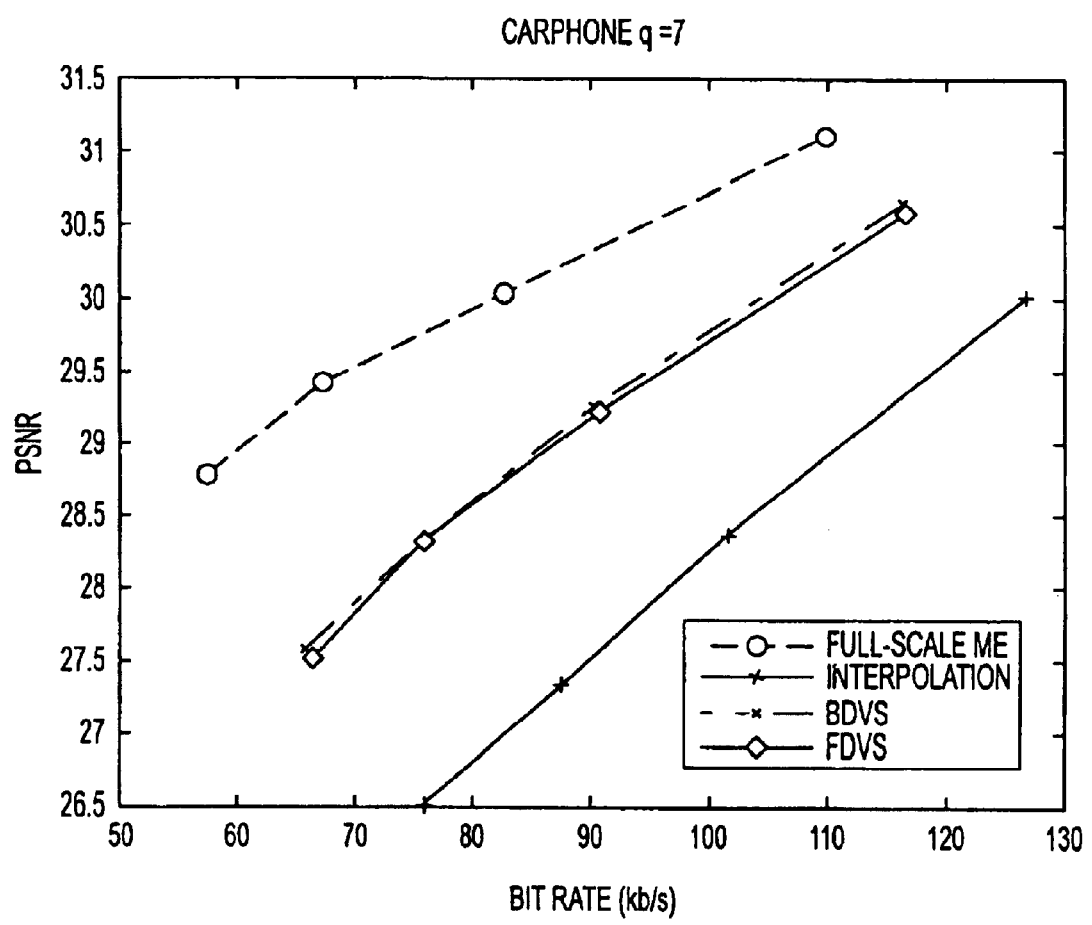
Figure 7C:
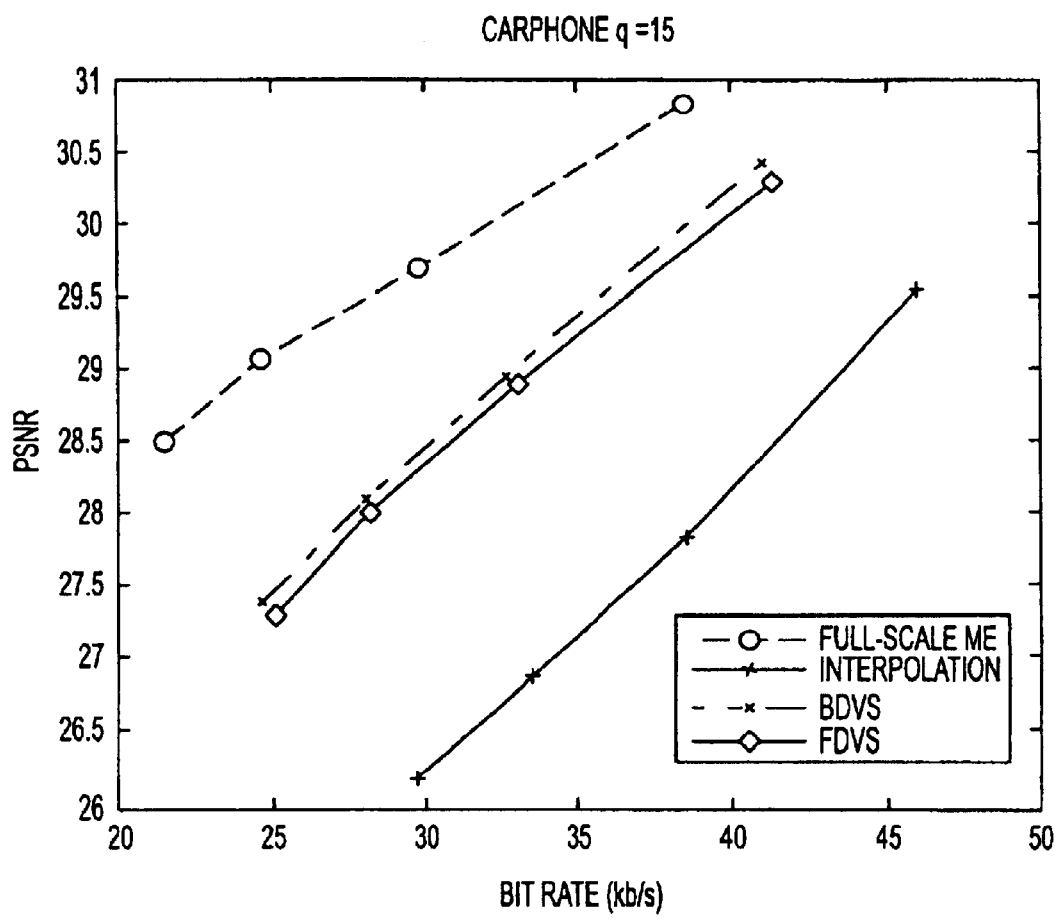

FIG. 7 shows the simulation results for the "carphone" sequence.

Figure 8A:
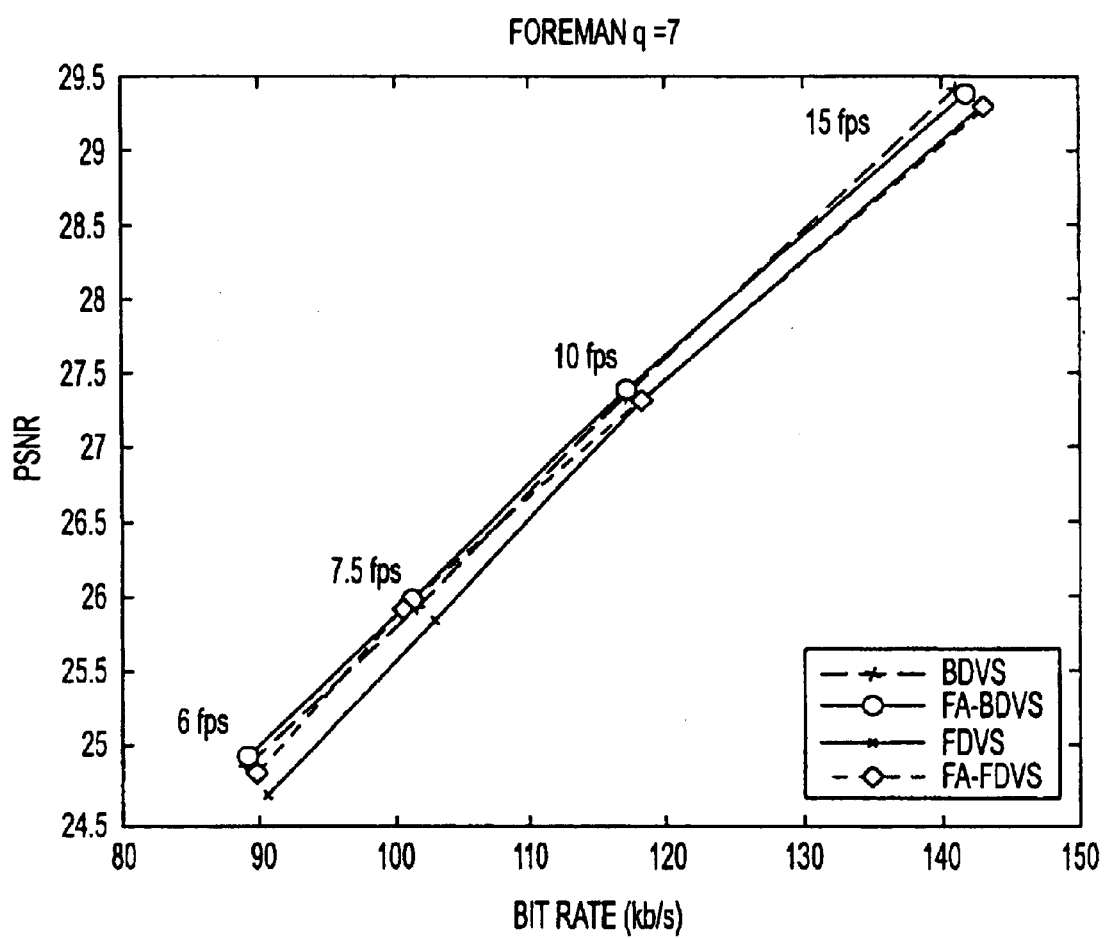
FIGS. 8(a)-(c) are PSNR-rate plots of various DVS motion vector composition schemes with "foreman" sequence, where the incoming bit-stream was encoded using a quantization step-size of Q and transcoded into different frame rates (15, 10, 7.5, and 6 fps) using the same quantization step-size: (a) Q=7; (b) Q=10; (c) Q=15.
Figure 8B:
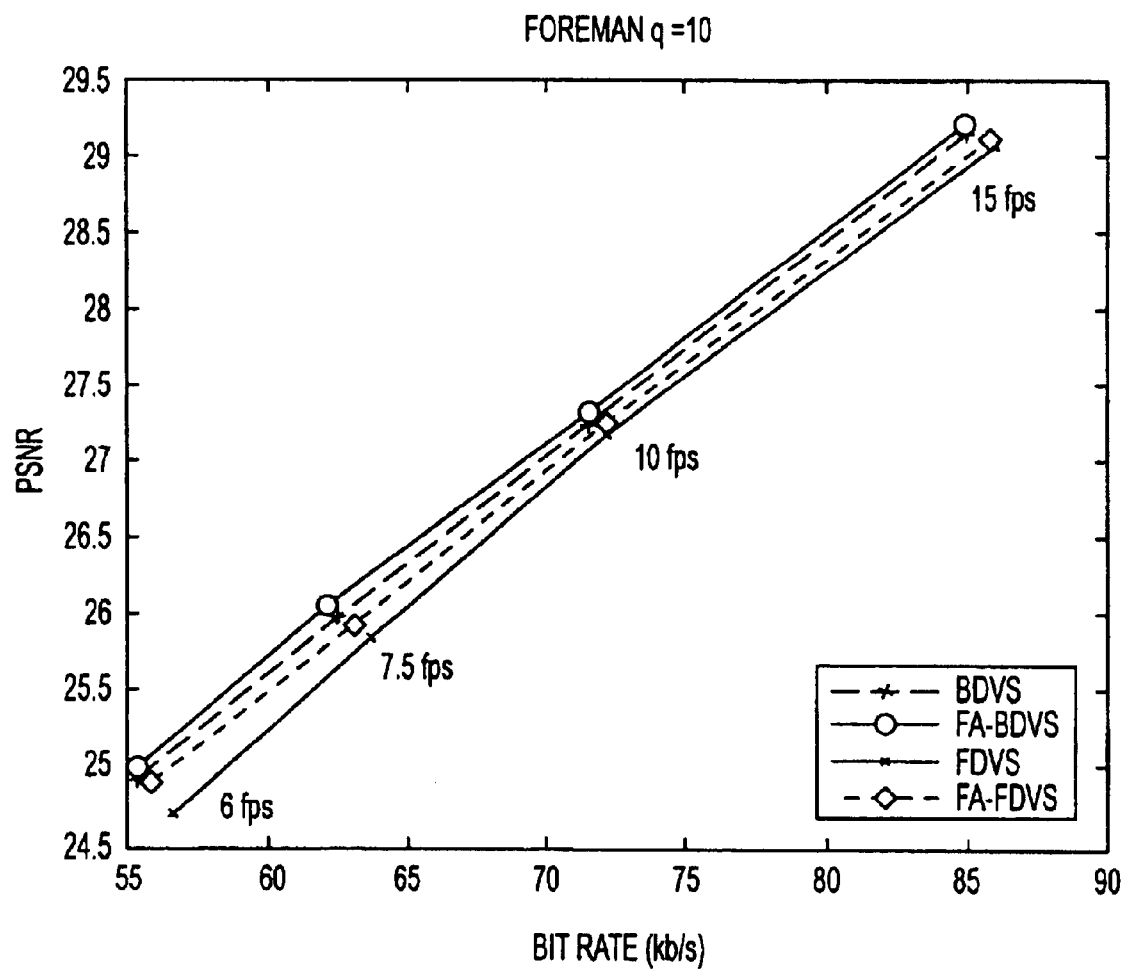
Figure 8C:
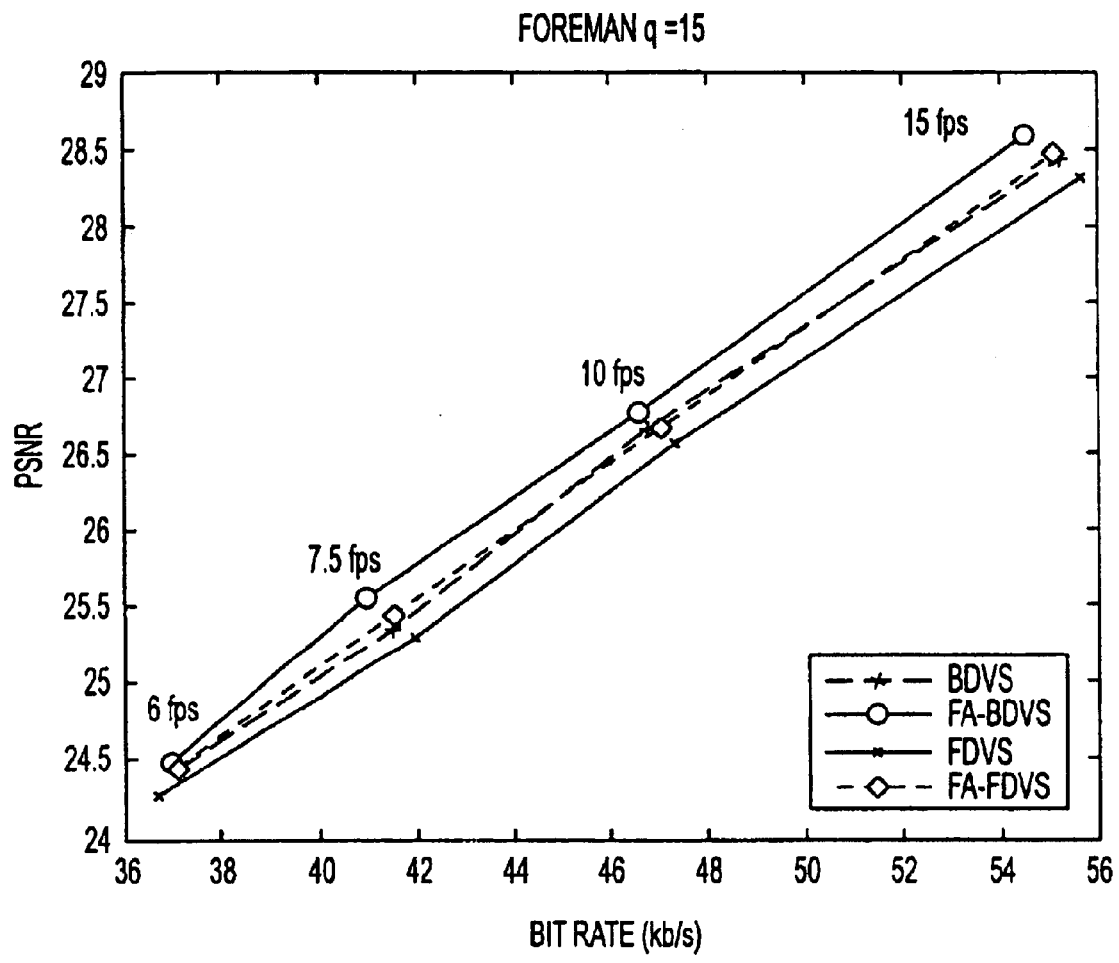
Figure 9A:
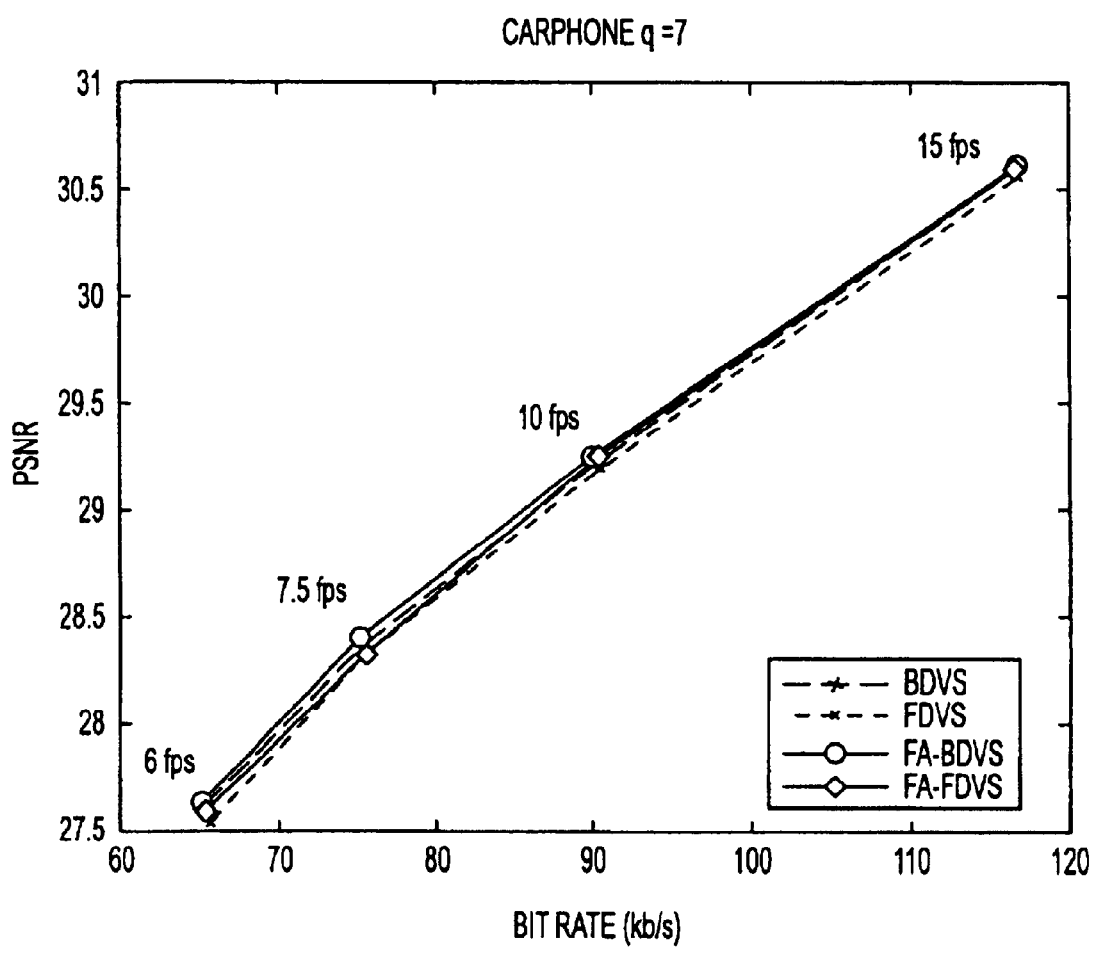
FIGS. 9(a)–(c) are PSNR-rate plots of various DVS motion vector composition schemes with "carphone" sequence, where the incoming bit-stream was encoded using a quantization step-size of Q and transcoded into different frame rates (15, 10, 7.5, and 6 fps)using the same quantization step-size: (a) Q=7; (b) Q=10; (c) Q=15.
Figure 9B:
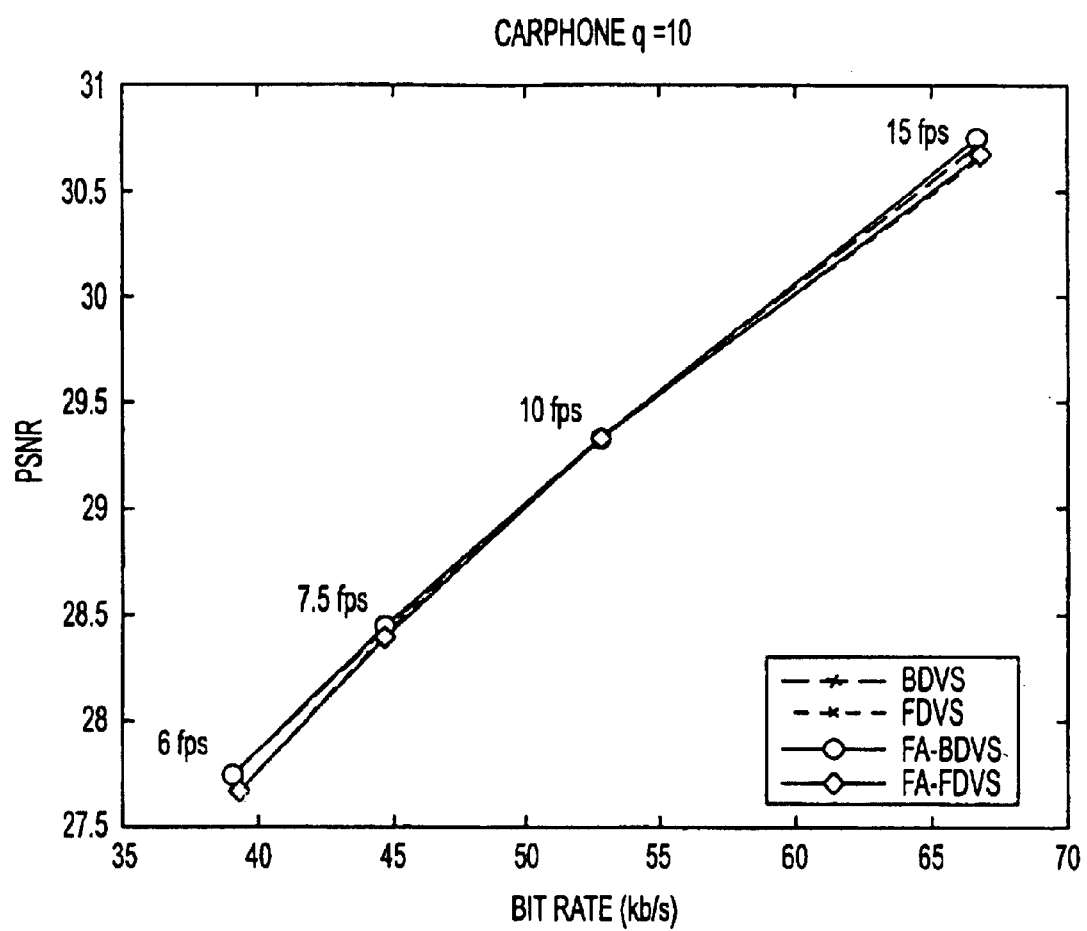
Figure 9C:
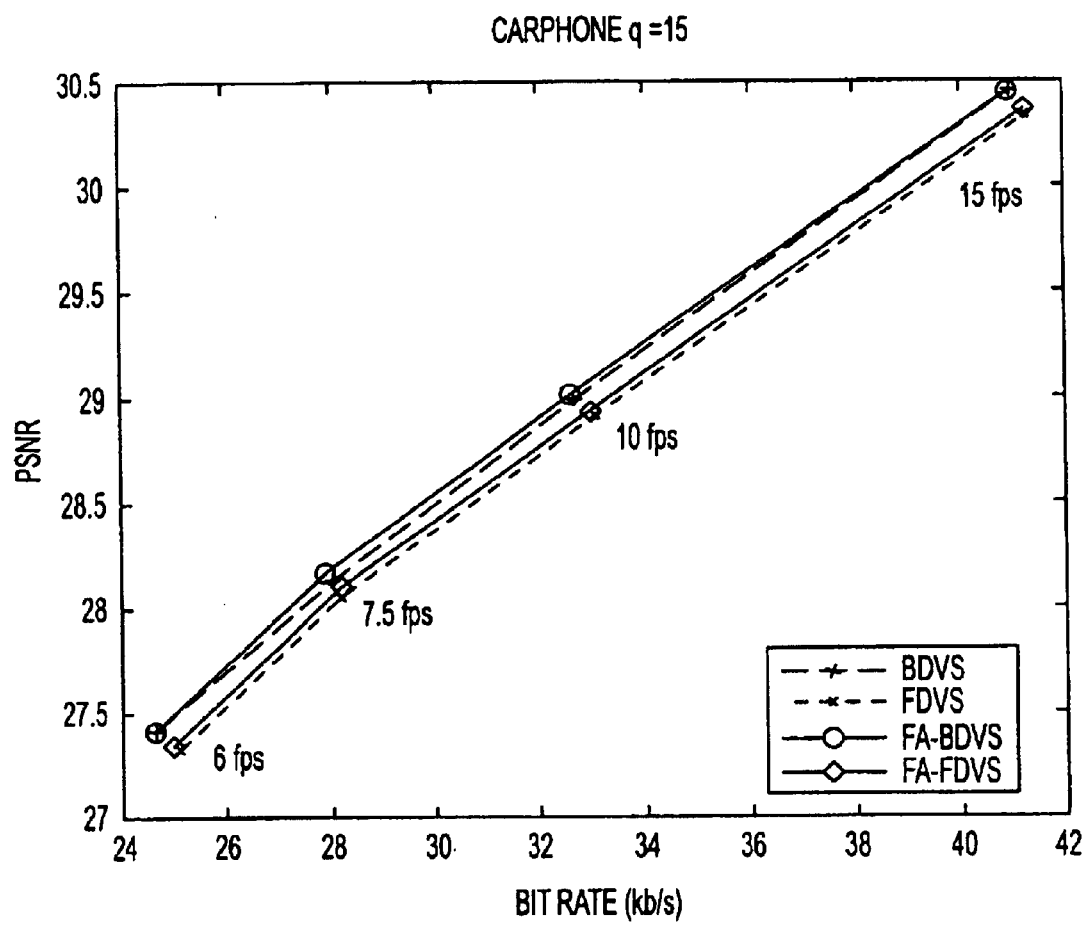

FIGS. 8 and 9 show the PSNR-rate comparisons of the proposed DVS schemes with two test sequences, "foreman" and "carphone". The test sequences were first encoded using a quantization step-size and then transcoded into different frame rates (15, 10, 7.5, and 6 fps) using the same quantization step-size. The quantization step-sizes used for simulation are 7, 10, and 15, which can produce various bit-rates ranging from 145 to 36 Kbps. The simulation results show that the proposed pre-filtered activity-based DVS schemes of the present invention provide almost the same quality as the BDVS and FDVS schemes at higher bit-rates, while the performance improvement increases as the bit-rate decreases (quantization step-size increases and/or frame rate decreases).

Figure 10A:
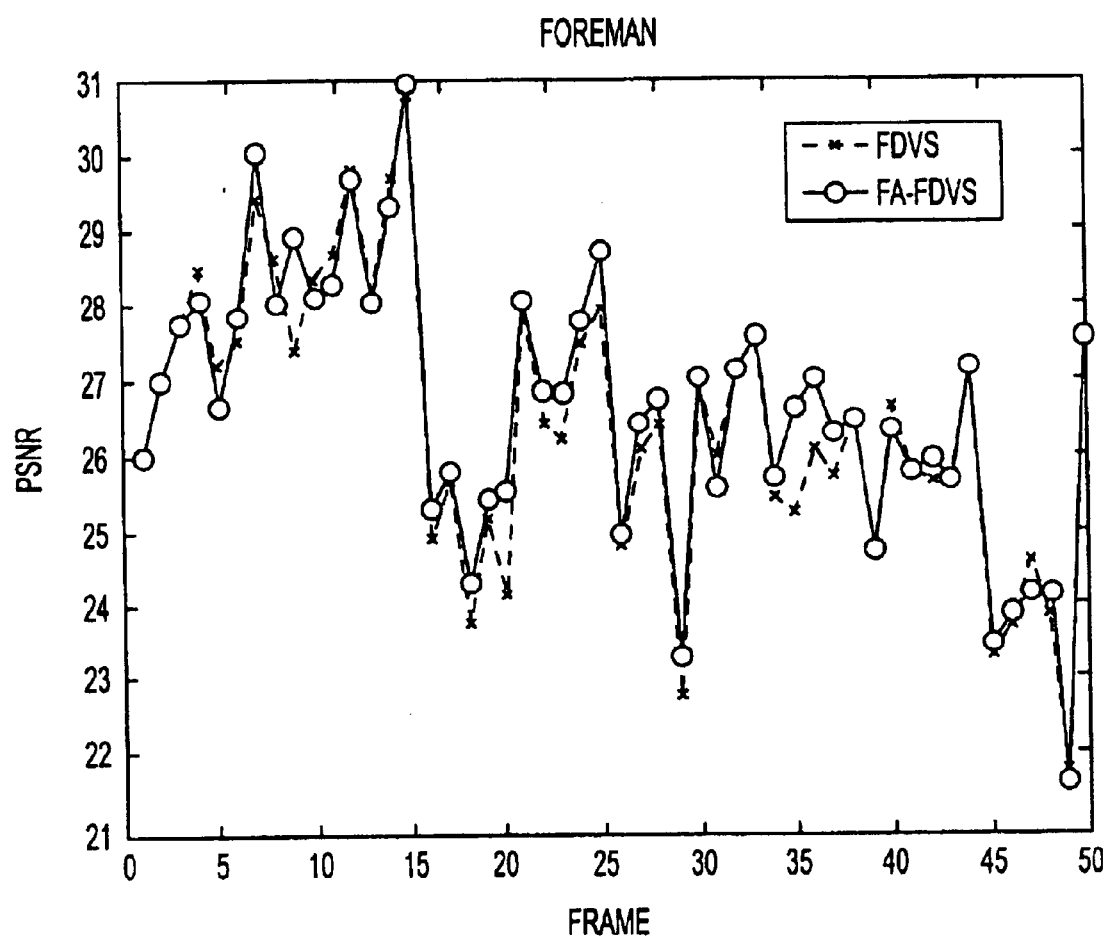
FIGS. 10(a)–(b) are performance comparisons of the FDVS and the FA-FDVS schemes, where the incoming bit-streams of 128 Kb/s and 30 fps were transcoded into 32 Kb/s and 7.5 fps: (a) "foreman" sequences (b) "carphone" sequence.
Figure 10B:
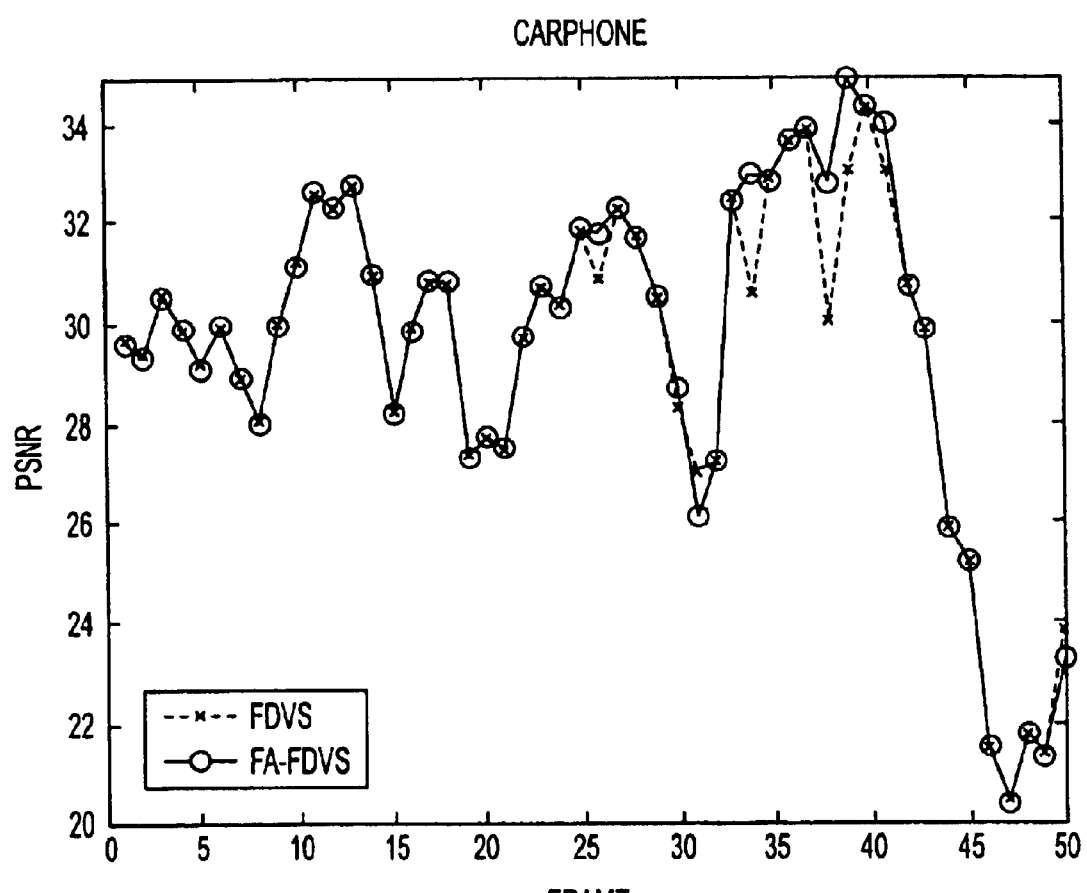
Figure 11A:
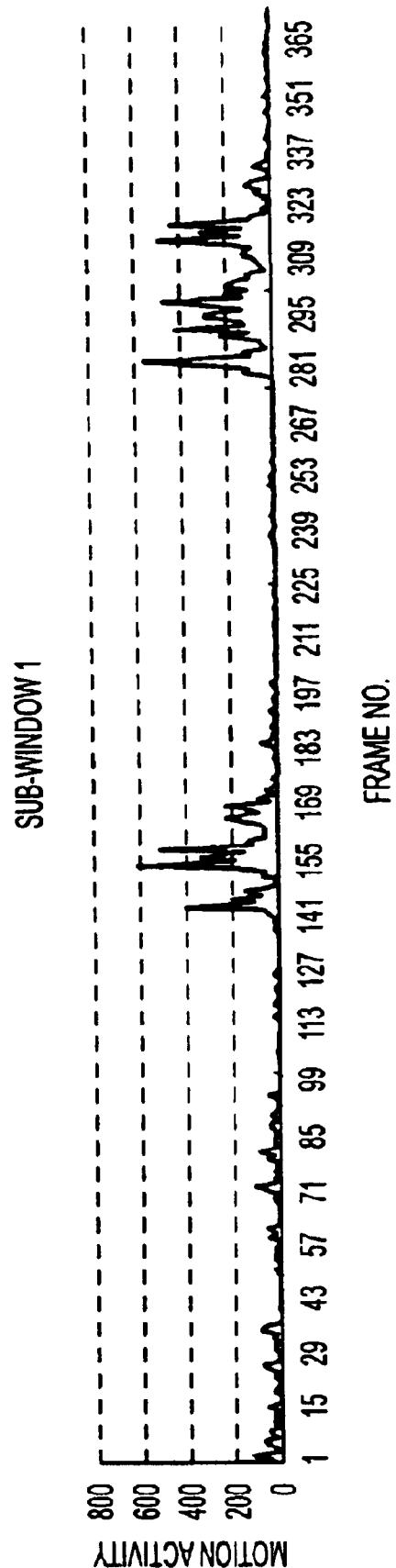
FIGS. 11(a)–(d) show motion activity of each sub-window.
Figure 11B:
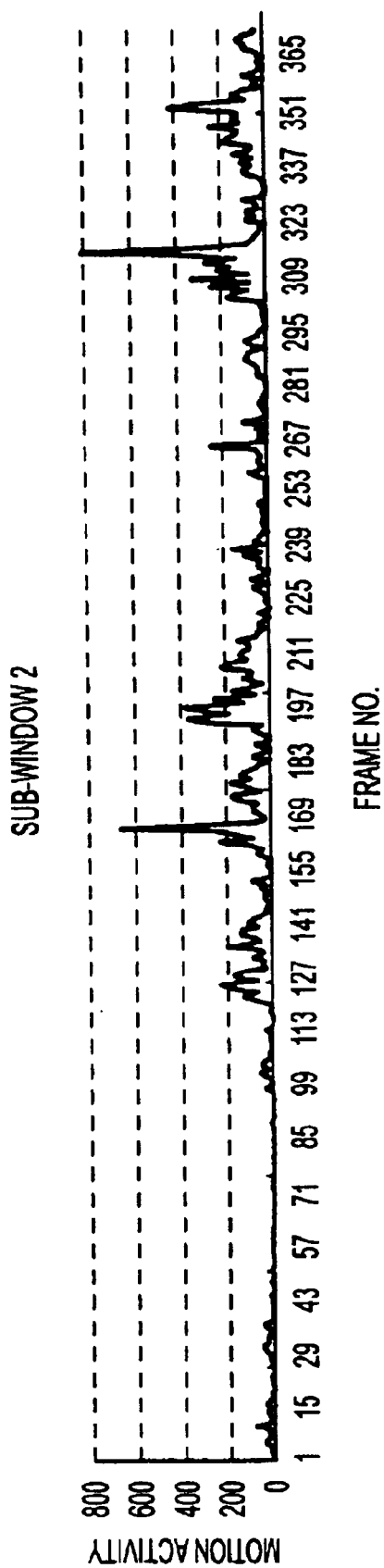
Figure 11C:
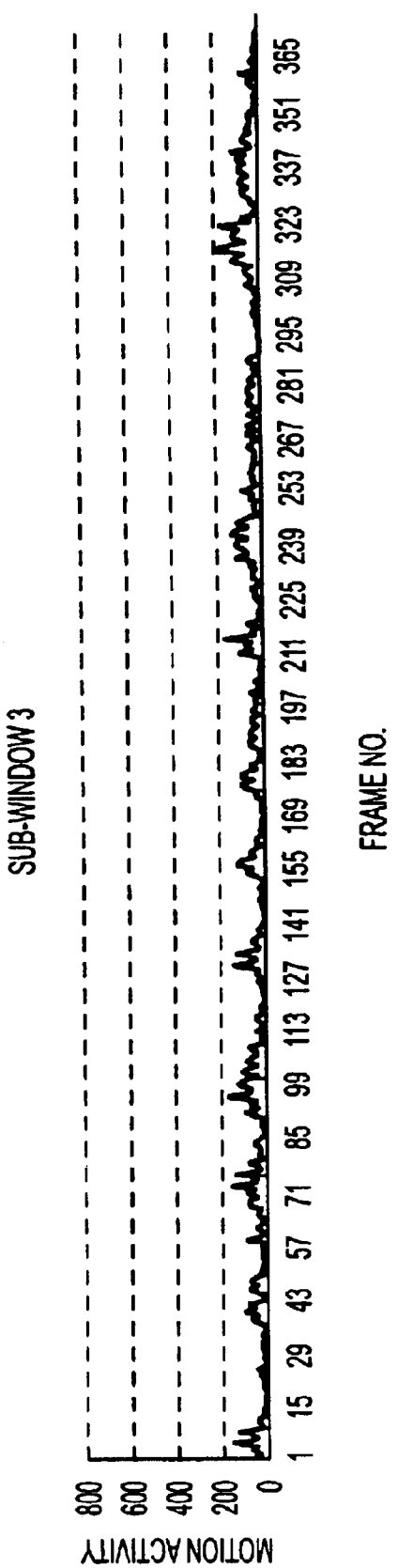
Figure 11D:
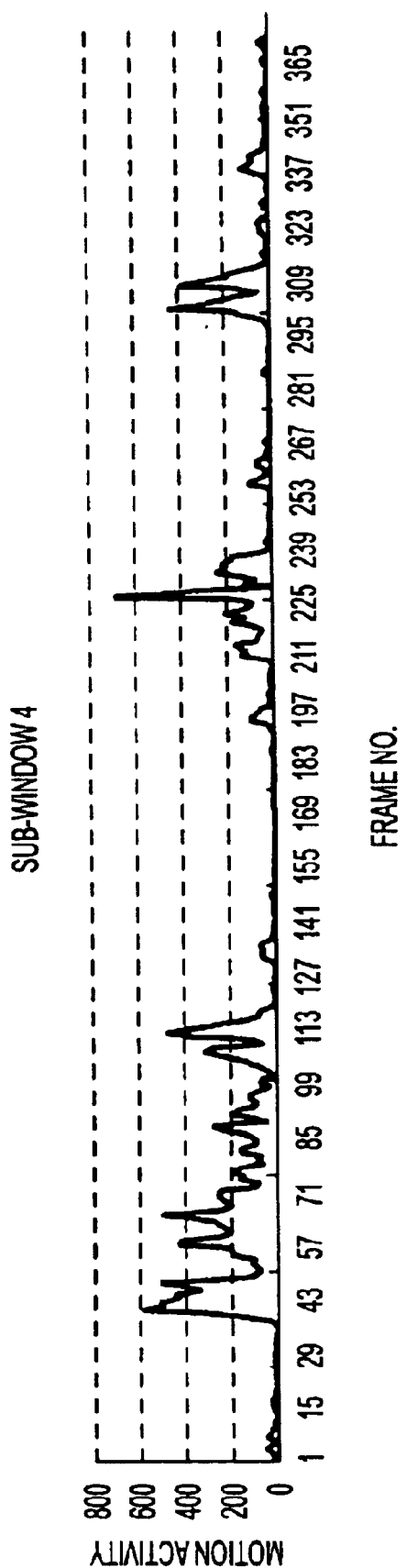

FIG. 10 shows the per-frame PSNR comparison of two test sequences, "foreman" and "carphone" using the FDVS scheme and the FA-FDVS scheme according to the present invention. The test sequences were first encoded at 128 kbps with 30 fps, and then transcoded to about 32 kbps with 7.5 fps. Although the average PSNR improvement is not significant as shown in Table 1, the FA-FDVS can achieve significant PSNR improvement over the FDVS scheme on several frames with divergent object motions.

Figure 12A:
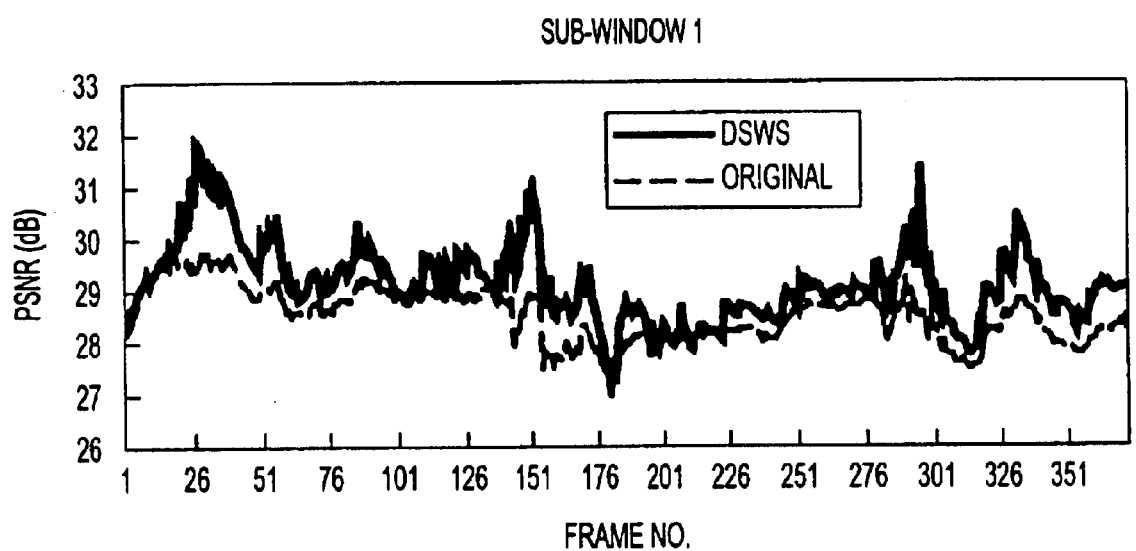
FIGS. 12(a)–(c) show PSNR of the method according to the present invention and TMN8 rate control.
Figure 12B:
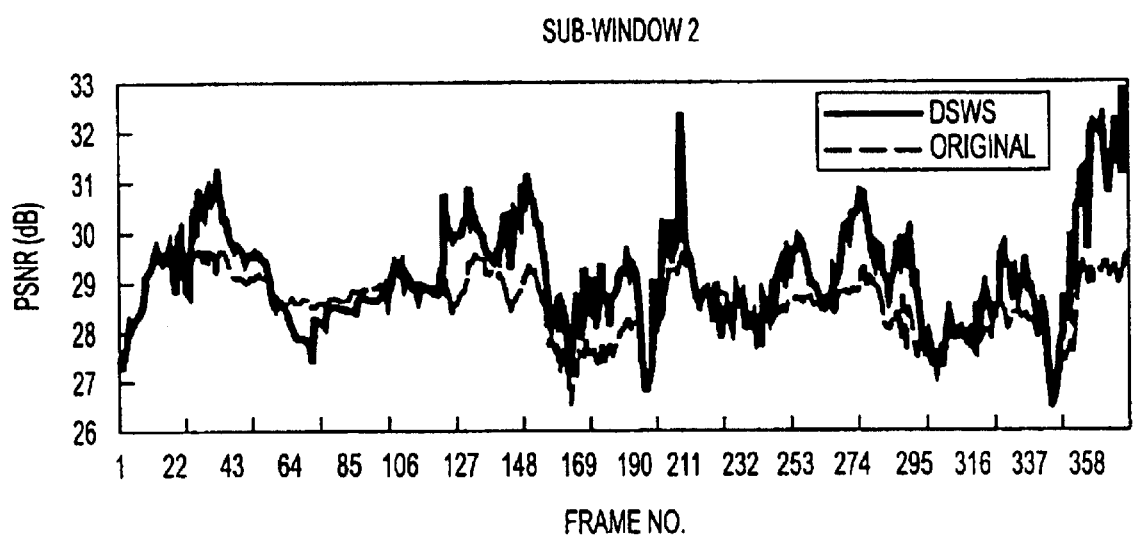
Figure 12C:
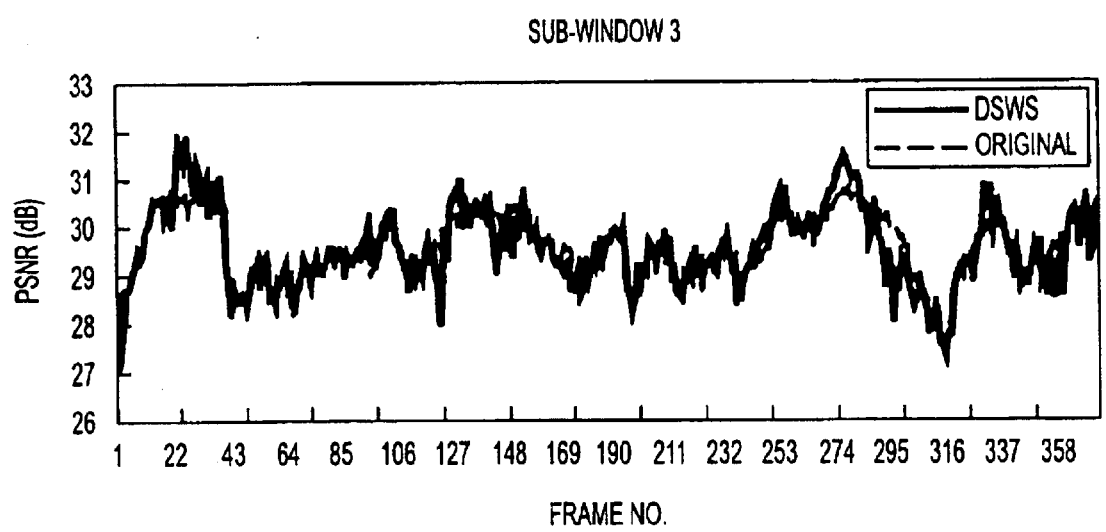

FIG. 11 depicts the motion activity of each sub-window. FIG. 12 compares the PSNR performance of the DSWS method of the present invention and the direct transcoding using TMN8 rate control. The results show that the DSWS method of the present invention improves the PSNR gain on the sub-windows with relatively high activities, while the low-activity sub-windows are degraded. Table 2 compares the average PSNR of all the sub-windows with the two methods. The PSNR of a skipped sub-window is computed from the incoming QCIF image and the latest previously reconstructed non-skipped sub-window, since the sub-window repetition method is used to interpolate the skipped sub-windows. The thresholds, THMV1 and THSAD1, are set to 0.2 and 10 respectively. As shown in FIG. 3 and Table 1, the DSWS scheme of the present invention achieves 0.2 and 0.39 dB average PSNR improvements on the non-skipped sub-windows. In sub-window 4, the performance degrades by 0.4 dB because of its many long intervals with relatively low motion activity.

TABLE 1

Performance comparison of different motion vector estimation and composition methods. Incoming bit-streams of 128 Kb/s and 30 fps were transcoded into 32 Kb/s and 7.5 fps.

| Test sequence | MV composition method | Average PSNR |
|---|---|---|
| Foreman | Full-scale ME | 27.39 |
| | Interpolation | 23.72 |
| | BDVS | 25.75 |
| | FDVS | 25.51 |
| | FA-BDVS | 25.79 |
| | FA-FDVS | 25.67 |
| Carphone | Full-scale ME | 29.47 |
| | Interpolation | 27.07 |
| | BDVS | 28.20 |
| | FDVS | 28.16 |
| | FA-BDVS | 28.34 |
| | FA-FDVS | 28.27 |

TABLE 2

Average PSNR Comparison of the proposed DSWS, DSWS+RDS, DSWS+RDST, and direct transcoding schemes:

| | Skipped frame No. | Average PSNR of all frames (dB) | | | Average PSNR of non-skipped frames (dB) | | |
|---|---|---|---|---|---|---|---|
| | | Original | DSWS | | Original | DWSW | |
| Sub-window 1 | 151 | 28.54 | 29.14 | +0.60 | 28.55 | 29.31 | +0.76 |
| Sub-window 2 | 75 | 28.59 | 29.16 | +0.57 | 28.52 | 29.25 | +0.73 |
| Sub-window 3 | 54 | 29.54 | 29.56 | +0.02 | 29.48 | 29.59 | +0.11 |
| Sub-window 4 | 139 | 28.99 | 28.59 | −0.40 | 28.73 | 28.68 | −0.05 |
| Average | 104.75 | 28.91 | 29.11 | +0.20 | 28.82 | 29.21 | +0.39 |

Although the present invention has been fully described by way of examples with reference to the accompanying drawings, it should be understood that numerous variations, modifications and substitutions, as well as rearrangements and combinations, of the preceding embodiments will be apparent to those skilled in the art without departing from the novel spirit and scope of this invention.

What is claimed is:

1. A video system, comprising:

(a) transcoder means for (i) receiving multiple incoming encoded digital video signals respectively sent over plural transmission paths from a plurality of video devices, (ii) processing said received video signals and (iii) combining the processed video signals into an output video signal comprising a single coded video bit stream, respective portions of said output video signal corresponding to said video signals sent from said plurality of video devices constituting sub-windows of said output video signal; and (b) means for transmitting the output video signal through said transmission paths to said plurality of video devices, sub-window;

wherein said transcoder means comprises:

(i) means for classifying said sub-windows into active sub-windows and static sub-windows; and (ii) means for generating said output video signal by (1) transcoding frames of said active sub-windows while skipping transcoding of frames of said static sub-windows and substituting a latest corresponding encoded sub-window for a skipped sub-window to approximate the skipped sub-window, and (2) obtaining outgoing motion vectors of said output video signal from incoming motion vectors of said active sub-windows and said static sub-windows by obtaining a motion vector of a non-aligned macroblock, which is not aligned with segmented macroblock boundaries in said sub-windows, by a dominant vector selection operation comprising pre-filtering out unreliable motion vectors of said segmented macroblock boundaries and selecting the one of said segmented macroblock boundaries having the largest overlapping activity as the dominant block, and selecting the motion vector of said dominant block as said motion vector of said non-aligned macroblock.

2. The system of claim 2, wherein said prefiltering operation comprises determining whether a strongly overlapping dominant block exists among said segmented macroblocks.

3. The system of claim 2, wherein:
   (i) said operation of determining whether a strongly overlapping dominant block exists among said segmented macroblocks comprises:
   calculating the largest overlapping area of each of the segmented macroblocks with said non-aligned macroblock, and if the largest overlapping area of one of the segmented macroblocks is greater than a predetermined threshold, then selecting the motion vector of the one of said segmented macroblocks with the largest overlapping area as the dominant vector, and if the largest overlapping area is not greater than said predetermined threshold, then setting an initial candidate list as the four motion vectors $\{IV_1, IV_2, IV_3, IV_4\}$ of the segmented macroblocks, calculating the mean and the standard deviation of said four motion vectors in accordance with the relation:

$$IV_{mean} = \frac{1}{4}\sum_{i=1}^{4} IV_i$$

$$IV_{std} = \sqrt{\frac{1}{4}\sum_{i=1}^{4} (IV_i - IV_{mean})^2}$$

for i=1 to 4,
if $|IV_i - IV_{mean}| > k_{std} \cdot IV_{std}$, removing $IV_i$ from the candidate list as unreliable, and if not, keeping $IV_i$ in the candidate list as reliable,
   (ii) said largest overlapping activity determining operation comprises, for each motion vector on the candidate list, calculating an area-activity product Ai·ACTi, i=1, 2,3,4, where Ai is the overlapping area with the segmented block (i) and ACTi is the activity measure, and
   (iii) the dominant vector is selected as the motion vector of the one of said segmented macroblocks with the largest said area-activity product.

4. The system of claim 1, wherein said means for classifying calculates a sum for each of said sub-windows of the magnitude of its motion vectors, compares the sum with a threshold, and classifies the sub-window as active or static in accordance with a comparison result.

5. The system of claim 1, wherein said means for processing obtains said outgoing motion vectors by, after a frame of a static sub-window is skipped, composing motion vectors of each skipped and non-skipped sub-window relative to its corresponding latest encoded sub-window.

6. The system of claim 1, wherein said dominant vector selection operation is a forward-dominant vector selection operation.

7. A video communication method comprising:
   (a) receiving multiple incoming encoded digital video signals respectively sent over plural transmission paths from a plurality of video devices;
   (b) processing said received video signals;
   (c) combining the processed video signals into an output video signal comprising a single coded video bit stream; and
   (d) transmitting the output video signal through said transmission paths to said plurality of video devices, respective portions of said output video signal corresponding to said video signals sent from said plurality of video devices constituting sub-windows of said output video signal;
   wherein processing step (b) comprises:
   (i) classifying said sub-windows into active sub-windows and static sub-windows; and
   (ii) generating said output video signal by
       (1) transcoding frames of said active sub-windows while skipping transcoding of frames of said static sub-windows and substituting a latest corresponding encoded sub-window for a skipped sub-window to approximate the skipped sub-window, and
       (2) obtaining outgoing motion vectors of said output video signal from incoming motion vectors of said active sub-windows and said static sub-windows by obtaining a motion vector of a non-aligned macroblock which is not aligned with segmented macroblock boundaries in said sub-windows by a dominant vector selection operation comprising pre-filtering out unreliable motion vectors of said segmented macroblock boundaries and selecting the one of said segmented macroblock boundaries having the largest overlapping activity as the dominant block, and selecting the motion vector of said dominant block as said motion vector of said non-aligned macroblock.

8. The method of claim 7, wherein said prefiltering step comprises determining whether a strongly overlapping dominant block exists among said segmented macroblocks.

9. The method of claim 8, wherein:
   (i) said step of determining whether a strongly overlapping dominant block exists among said segmented macroblocks comprises:
   calculating the largest overlapping area of each of the segmented macroblocks with said non-aligned macroblock, and if the largest overlapping area of one of the segmented macroblocks is greater than a predetermined threshold, then selecting the motion vector of the one of said segmented macroblocks with the largest overlapping area as the dominant vector, and if the largest overlapping area is not greater than said predetermined threshold, then setting an initial candidate list as the four motion vectors $\{IV_1, IV_2, IV_3, IV_4\}$ of the four segmented macroblocks, calculating the mean and the standard deviation of said four motion vectors in accordance with the relation:

$$IV_{mean} = \frac{1}{4}\sum_{i=1}^{4} IV_i$$

$$IV_{std} = \sqrt{\frac{1}{4}\sum_{i=1}^{4} (IV_i - IV_{mean})^2}$$

for i=1 to 4,
if $|IV_i - IV_{mean}| > k_{std} \cdot IV_{std}$, removing $IV_i$ from the candidate list as unreliable, and if not, keeping $IV_i$ in the candidate list as reliable;
   (ii) said step of determining said largest overlapping activity comprises, for each motion vector on the candidate list, calculating an area-activity product Ai·ACTi, i=1,2,3,4, where Ai is the overlapping area with the neighboring block (i) and ACTi is the activity measure, and (iii) said method further comprises selecting the dominant vector as the motion vector of the one of said segmented macroblocks with the largest said area-activity product.

10. The method of claim 7, wherein said classifying step comprises calculating a sum for each of said sub-windows of the magnitude of its motion vectors, comparing the sum with a threshold, and classifying the sub-window as active or static in accordance with a comparison result.

11. The method of claim 7, wherein said processing step comprises obtaining said outgoing motion vectors by, after a frame of a static sub-window is skipped, composing motion vectors of each skipped and non-skipped sub-window relative to its corresponding latest encoded sub-window.

12. The method of claim 7, wherein said dominant vector selection operation is a forward dominant vector selection operation.

13. A video transcoder comprising:
    (a) means for receiving multiple incoming encoded digital video signals respectively sent over plural transmission paths from a plurality of video devices,
    (b) means for processing said received video signals and
    (c) means for combining the processed video signals into an output video signal comprising a single coded video bit stream, respective portions of said output video signal corresponding to said video signals sent from said plurality of video devices constituting sub-windows of said output video signal;
    wherein said means for processing comprises:
       (i) means for classifying said sub-windows into active sub-windows and static sub-windows; and
       (ii) means for generating said output video signal by
          (1) transcoding frames of said active sub-windows while skipping transcoding of frames of said static sub-windows and substituting a latest corresponding encoded sub-window for a skipped sub-window to approximate the skipped sub-window, and
          (2) obtaining outgoing motion vectors of said output video signal from incoming motion vectors of said active sub-windows and said static sub-windows by obtaining a motion vector of a non-aligned macroblock, which is not aligned with segmented macroblock boundaries in said sub-windows, by a dominant vector selection operation comprising pre-filtering out unreliable motion vectors of said segmented macroblock boundaries and selecting the one of said segmented macroblock boundaries having the largest overlapping activity as the dominant block, and selecting the motion vector of said dominant block as said motion vector of said non-aligned macroblock.

14. The transcoder of claim 13, wherein said prefiltering operation comprises determining whether a strongly overlapping dominant block exists among said segmented macroblocks.

15. The transcoder of claim 14, wherein:
    (i) said operation of determining whether a strongly overlapping dominant block exists among said segmented macroblocks comprises:
       calculating the largest overlapping area of each of the segmented macroblocks with said non-aligned macroblock, and if the largest overlapping area of one of the segmented macroblocks is greater than a predetermined threshold, then selecting the motion vector of the one of said segmented macroblocks with the largest overlapping area as the dominant vector, and if the largest overlapping area is not greater than said predetermined threshold, then setting an initial candidate list as the four motion vectors $\{IV_1, IV_2, IV_3, IV_4\}$ of the segmented macroblocks, calculating the mean and the standard deviation of said four motion vectors in accordance with the relation:

$$IV_{mean} = \frac{1}{4}\sum_{i=1}^{4} IV_i$$

$$IV_{std} = \sqrt{\frac{1}{4}\sum_{i=1}^{4}(IV_i - IV_{mean})^2}$$

for i=1 to 4,
   if $|IV_i - IV_{mean}| > k_{std} \cdot IV_{std}$, removing $IV_i$ from the candidate list as unreliable, and if not, keeping $IV_i$ in the candidate list as reliable, (ii) said largest overlapping activity determining operation comprises, for each motion vector on the candidate list, calculating an area-activity product Ai·ACTi, i=1, 2,3,4, where Ai is the overlapping area with the segmented block (i) and ACTi is the activity measure, and
   (iii) the dominant vector is selected as the motion vector of the one of said segmented macroblocks with the largest said area-activity product.

16. The transcoder of claim 13, wherein said means for classifying calculates a sum for each of said sub-windows of the magnitude of its motion vectors, compares the sum with a threshold, and classifies the sub-window as active or static in accordance with a comparison result.

17. The transcoder of claim 13, wherein said means for processing obtains said outgoing motion vectors by, after a frame of a static sub-window is skipped, composing motion vectors of each skipped and non-skipped sub-window relative to its corresponding latest encoded sub-window.

18. The transcoder of claim 13, wherein said dominant vector selection operation is a forward dominant vector selection operation.

19. A video transcoding method comprising:
    (a) receiving multiple incoming encoded digital video signals respectively sent over plural transmission paths from a plurality of video devices;
    (b) processing said received video signals; and
    (c) combining the processed video signals into an output video signal comprising a single coded video bit stream, respective portions of said output video signal corresponding to said video signals sent from said plurality of video devices constituting sub-windows of said output video signal;
    wherein processing step (b) comprises:
       (i) classifying said sub-windows into active sub-windows and static sub-windows; and
       (ii) generating said output video signal by
          (1) transcoding frames of said active sub-windows while skipping transcoding of frames of said static sub-windows and substituting a latest corresponding encoded sub-window for a skipped sub-window to approximate the skipped sub-window, and
          (2) obtaining outgoing motion vectors of said output video signal from incoming motion vectors of said active sub-windows and said static sub-windows by obtaining a motion vector of a non-aligned macroblock which is not aligned with segmented macroblock boundaries in said sub-windows by a dominant vector selection operation comprising pre-filtering out unreliable motion vectors of said segmented macroblock boundaries and selecting the one of said segmented macroblock boundaries having the largest overlapping activity as the dominant block, and selecting the motion vector of said dominant block as said motion vector-of said non-aligned macroblock.

20. The method of claim 19, wherein said prefiltering step comprises determining whether a strongly overlapping dominant block exists among said segmented macroblocks.

21. The method of claim 20, wherein:

(i) said step of determining whether a strongly overlapping dominant block exists among said segmented macroblocks comprises:

calculating the largest overlapping area of each of the segmented macroblocks with said non-aligned macroblock, and if the largest overlapping area of one of the segmented macroblocks is greater than a predetermined threshold, then selecting the motion vector of the one of said segmented macroblocks with the largest overlapping area as the dominant vector, and if the largest overlapping area is not greater than said predetermined threshold, then setting an initial candidate list as the four motion vectors $\{IV_1, IV_2, IV_3, IV_4\}$ of the four segmented macroblocks, calculating the mean and the standard deviation of said four motion vectors in accordance with the relation:

$$IV_{mean} = \frac{1}{4}\sum_{i=1}^{4} IV_i$$

-continued $$IV_{std} = \sqrt{\frac{1}{4}\sum_{i=1}^{4}(IV_i - IV_{mean})^2}$$

for i=1 to 4,
if $|IV_i - IV_{mean}| > k_{std} \cdot IV_{std}$, removing $IV_i$ from the candidate list as unreliable, and if not, keeping $IV_i$ in the candidate list as reliable;

(ii) said step of determining said largest overlapping activity comprises, for each motion vector on the candidate list, calculating an area-activity product $Ai \cdot ACTi$, i=1,2,3,4, where Ai is the overlapping area with the neighboring block (i) and ACTi is the activity measure, and (iii) said method further comprises selecting the dominant vector as the motion vector of the one of said segmented macroblocks with the largest said area-activity product.

22. The method of claim 19, wherein said classifying step comprises calculating a sum for each of said sub-windows of the magnitude of its motion vectors, comparing the sum with a threshold, and classifying the sub-window as active or static in accordance with a comparison result.

23. The method of claim 19, wherein said processing step comprises obtaining said outgoing motion vectors by, after a frame of a static sub-window is skipped, composing motion vectors of each skipped and non-skipped sub-window relative to its corresponding latest encoded sub-window.

24. The method of claim 19, wherein said dominant vector selection operation is a forward dominant vector selection operation.

* * * * *